United States Patent
Takatomi et al.

(10) Patent No.: US 7,887,319 B2
(45) Date of Patent: Feb. 15, 2011

(54) APPARATUS FOR COOLING PREFORMED ARTICLES AND METHOD OF COOLING PREFORMED ARTICLES

(75) Inventors: Kunihiro Takatomi, Yokohama (JP); Shoichiro Takano, Yokohama (JP); Masayuki Sasaki, Yokohama (JP); Ken Itou, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 350 days.

(21) Appl. No.: 12/089,682

(22) PCT Filed: Sep. 7, 2006

(86) PCT No.: PCT/JP2006/318217

§ 371 (c)(1),
(2), (4) Date: Apr. 29, 2008

(87) PCT Pub. No.: WO2007/043279

PCT Pub. Date: Apr. 19, 2007

(65) Prior Publication Data

US 2009/0229795 A1    Sep. 17, 2009

(30) Foreign Application Priority Data

Oct. 11, 2005  (JP) .............................. 2005-296435

(51) Int. Cl.
*B29C 49/64* (2006.01)
(52) U.S. Cl. ............... 425/526; 425/539; 425/DIG. 108
(58) Field of Classification Search ................. 425/526, 425/539, DIG. 38, DIG. 108, 547, 378.1
See application file for complete search history.

(56) References Cited

U.S. PATENT DOCUMENTS

| | | | | |
|---|---|---|---|---|
| 3,114,596 A | * | 12/1963 | Wechsler et al. | 264/520 |
| 3,792,941 A | * | 2/1974 | Maroschak | 425/539 |
| 4,003,685 A | * | 1/1977 | Maroschak | 425/135 |
| 4,019,849 A | | 4/1977 | Farrell | |
| 4,185,812 A | * | 1/1980 | Hall | 198/867.05 |
| 4,483,436 A | * | 11/1984 | Krishnakumar et al. | 198/795 |
| 4,684,012 A | * | 8/1987 | Feddersen | 198/867.05 |
| 4,767,311 A | * | 8/1988 | Gibbemeyer | 425/526 |
| 5,393,211 A | * | 2/1995 | Hegler et al. | 425/149 |
| 6,131,724 A | * | 10/2000 | Hirasawatu et al. | 198/681 |
| 6,257,806 B1 | * | 7/2001 | Bernard | 406/189 |
| RE38,396 E | * | 1/2004 | Gellert | 29/411 |
| 6,889,823 B2 | * | 5/2005 | Delaporte et al. | 198/836.3 |
| 6,942,480 B2 | * | 9/2005 | Drysdale et al. | 425/526 |

(Continued)

FOREIGN PATENT DOCUMENTS

EP            0241040 A1    4/1987

(Continued)

*Primary Examiner*—Yogendra N Gupta
*Assistant Examiner*—Emmanuel S Luk
(74) *Attorney, Agent, or Firm*—Sughrue Mion, PLLC

(57) ABSTRACT

An apparatus for cooling preformed articles, which is capable of very effectively cooling the preformed articles and is, further, capable of sufficiently suppressing or preventing the preformed articles from being locally damaged as a result of coming in contact with each other as they are conveyed neighboring one another in a state of not yet fully cooled. A spray is blown onto the preformed articles 34 conveyed passing through a predetermined conveyer passage 42, a cooling liquid is blown next thereto, and a gas stream is further blown thereto.

13 Claims, 19 Drawing Sheets

U.S. PATENT DOCUMENTS

| | | | | |
|---|---|---|---|---|
| 7,141,190 | B2 * | 11/2006 | Hekal | 264/37.25 |
| 7,318,722 | B2 * | 1/2008 | Drysdale | 425/534 |
| 7,550,105 | B2 * | 6/2009 | Scheid | 264/520 |
| 7,556,137 | B2 * | 7/2009 | Charpentier | 198/395 |
| 7,632,089 | B2 * | 12/2009 | Bates et al. | 425/534 |
| 2001/0016239 | A1 * | 8/2001 | Koch et al. | 428/35.7 |
| 2003/0003181 | A1 * | 1/2003 | Hegler | 425/325 |
| 2005/0248054 | A1 * | 11/2005 | Bates et al. | 264/237 |
| 2006/0138696 | A1 * | 6/2006 | Weinmann | 264/237 |
| 2007/0224307 | A1 * | 9/2007 | Zoppas et al. | 425/445 |
| 2008/0042325 | A1 | 2/2008 | Imatani et al. | |
| 2008/0142339 | A1 * | 6/2008 | Charpentier | 198/626.1 |
| 2008/0152538 | A1 * | 6/2008 | Quetel et al. | 422/28 |
| 2008/0196998 | A1 * | 8/2008 | Lemaistre et al. | 198/469.1 |
| 2008/0226763 | A1 * | 9/2008 | Charpentier | 425/534 |
| 2009/0243161 | A1 * | 10/2009 | Beale | 264/535 |

FOREIGN PATENT DOCUMENTS

| | | | |
|---|---|---|---|
| JP | 5257259 | A | 5/1977 |
| JP | 54144280 | A | 10/1979 |
| JP | 6322624 | A | 1/1988 |
| JP | 636417 | A | 2/1988 |
| JP | 7171888 | A | 7/1995 |
| JP | 8103948 | A | 4/1996 |
| JP | 9123254 | A | 5/1997 |
| JP | 2005119208 | A | 5/2005 |
| JP | 2006248010 | A | 9/2006 |
| WO | 2005037526 | A1 | 4/2005 |

* cited by examiner

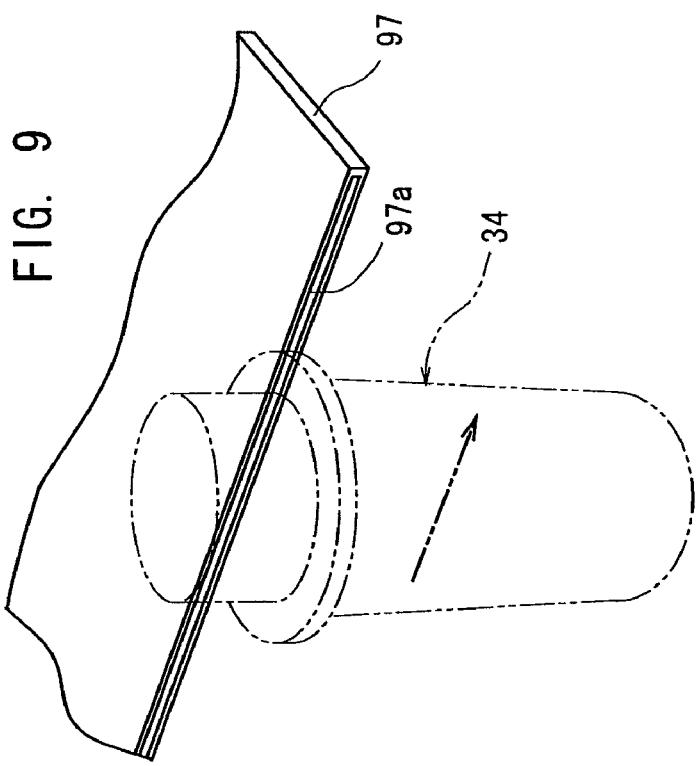
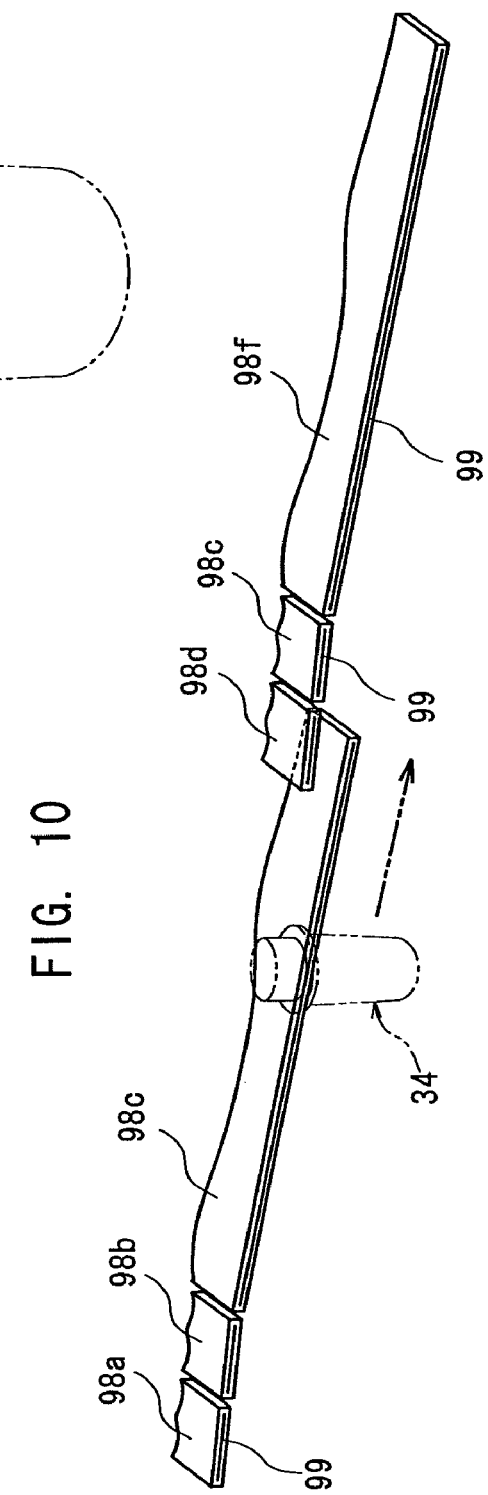

APPARATUS FOR COOLING PREFORMED ARTICLES AND METHOD OF COOLING PREFORMED ARTICLES

TECHNICAL FIELD

The present invention relates to an apparatus for cooling preformed articles which will be formed into containers through blow forming in a subsequent step.

BACKGROUND ART

Plastic containers have now been widely put into practical use as containers for beverages. As is widely known among people skilled in the art, the plastic containers are obtained by forming preformed articles (also, usually, called "preforms") by compression-forming or injection-forming a suitable synthetic resin and, thereafter, blow-forming the preformed articles. The preformed article, usually, has a cylindrical mouth-and-neck portion and a blow-formed portion of the shape of a cylinder with bottom or of a circular truncated cone with bottom continuous to the mouth-and-neck portion and, further, has a ring-like flange formed at the lower end of the mouth-and-neck portion.

The preformed article of a considerably high temperature (a [glass transition temperature] of a synthetic resin which is a material of the preformed article up to the [glass transition temperature]+0.22×{[melting temperature]−[glass transition temperature] thereof}, in polyethylene terephthalate e.g., about 80° C. to about 120° C., usually, about 100° C.) is often taken out from the mold after compression-formed or injection-formed. In this case, the temperature, usually, must be cooled down to 60° C. or lower to prevent the formed articles from being melt-adhered together or from being damaged upon coming in contact with one another. JP-A-7-171888 and JP-A-8-103948 disclose apparatuses for cooling preformed articles by blowing the air stream to the preformed articles while the preformed articles taken out from the mold are being conveyed through a predetermined carrier passage.

DISCLOSURE OF THE INVENTION

Problems to be Solved by the Invention

The conventional apparatuses for cooling the preformed articles by blowing the air stream to the preformed articles, however, involve a problem in that they are not capable of sufficiently and effectively cooling the preformed articles and require a time of 1.5 to 2 minutes for cooling the formed articles from about 100° C. down to about 60° C. When an extended time is required for cooling, the length the preformed articles are conveyed for being cooled inevitably increases accompanied by a problem of an increase in the size of the cooling apparatus.

The conventional apparatuses further involve a problem in that the preformed articles which are conveyed neighboring one another in a state of not yet fully cooled may come in contact with each other and may be locally damaged.

The present invention was accomplished in view of the above-mentioned facts, and its first technical problem is to provide a novel and improved apparatus for cooling preformed articles, which is capable of cooling the preformed articles very effectively.

A second technical problem is to provide a novel and improved apparatus for cooling preformed articles, which is capable of sufficiently suppressing or preventing the preformed articles from being locally damaged as a result of coming in contact with each other as they are conveyed neighboring one another in a state of not yet fully cooled. When an extended period of time is required for the cooling, there occurs such a problem that the synthetic resin is crystallized causing the formed articles to become whitened.

Means for Solving the Problems

The present invention is concerned with an apparatus for cooling preformed articles, wherein the preformed article as formed by a forming machine but before being subjected to a blow-forming includes a mouth-and-neck portion and a blow-formed portion, the mouth-and-neck portion being of a cylindrical shape and having a ring-like flange formed at the lower end thereof, and the blow-formed portion being of the shape of a cylinder with bottom continuous to the lower end of the mouth-and-neck portion, the apparatus for cooling preformed articles, comprising:

conveyer means for conveying the preformed articles through a conveyer passage inclusive of a cooling zone;

holding means for holding the preformed articles in at least the cooling zone; and cooling means for cooling the preformed articles by the cooling water in the cooling zone.

In the apparatus for cooling preformed articles, the cooling means comprises cooling nozzles arranged along the conveyer passage, and a spray of water is blown onto the preformed articles from the cooling nozzles.

In the apparatus for cooling preformed articles, the cooling means comprises cooling nozzles arranged along the conveyer passage, and the cooling water is blown onto the preformed articles from the cooling nozzles.

In the apparatus for cooling preformed articles, the cooling means comprises a water tank storing the cooling water, and the preformed articles are cooled by immersing the blow-formed portions of the preformed articles in the cooling water in the water tank.

In the apparatus for cooling preformed articles, the cooling means comprises a water tank storing the cooling water, and the preformed articles are cooled by being submerged in the cooling water in the water tank.

In the apparatus for cooling preformed articles, the conveyer means may comprise conveyers of endless chains including at least either a straight conveyer passage or a curved conveyer passage.

In the apparatus for cooling preformed articles, the conveyer means may be a rotary conveyer passage which rotates with the axis of rotation as a center.

In the apparatus for cooling preformed articles, the holding means comprises upper surfaces of conveyer running portions of conveyers constituted by endless chains arranged in parallel on the right and left maintaining a distance, and ring-like flanges of the preformed articles are suspended between the conveyer running portions.

In the apparatus for cooling preformed articles, the holding means comprises gap portions formed maintaining a gap up and down in the conveyer running portions of conveyers constituted by endless chains arranged in parallel on the right and left maintaining a distance, and ring-like flanges of the preformed articles are held in the gap portions.

In the apparatus for cooling preformed articles, the conveyers comprising the endless chains provided in parallel on the right and left maintaining a distance, travel at speeds different relative to each other at the time of conveying the preformed articles.

In the apparatus for cooling preformed articles, the holding means comprises grippers arranged on the rotary conveyer passage for holding the preformed articles maintaining a distance to the surroundings of the blow-formed portions of the preformed articles, and the ring-like flanges of the preformed articles are placed on the upper surfaces of the grippers.

In the apparatus for cooling preformed articles, the cooling means includes a circulating pump for supplying the cooling water, water-purifying means for removing fouling matter from the cooling water, sterilizing means for sterilizing the cooling water, and temperature-maintaining means for adjusting the temperature of the cooling water.

In the apparatus for cooling preformed articles, gas ejection means is provided on the downstream of the cooling apparatus for removing the cooling water adhering on or staying in the preformed articles.

In the apparatus for cooling preformed articles, the gas ejection means injects a gas onto the outer surfaces of the preformed articles from the transverse direction, and the position where the gas ejection means blows the gas onto the outer surfaces of the preformed articles becomes low from the upstream side toward the downstream side in the direction in which the preformed articles are conveyed.

In the apparatus for cooling preformed articles, the gas ejection means injects a gas into the inner surface side of the preformed articles though the openings thereof, and the positions where the gas ejection means blows the gas into the inner surfaces of the preformed articles are deviated from the centers of the openings of the preformed articles.

The preformed articles of the blow-formed containers formed by the compression forming and taken out at a high temperature, can be cooled by using the water.

EFFECT OF THE INVENTION

In the apparatus for cooling preformed articles provided by the present invention, a cooling liquid is blown onto the preformed articles conveyed through the cooling zone and, therefore, the preformed articles are effectively cooled.

In the apparatus for cooling preformed articles provided by the present invention, a spray is blown onto the preformed articles prior to cooling the preformed articles in order to sufficiently suppress or prevent the preformed articles from being locally damaged as a result of coming in contact with each other as they are conveyed neighboring one another in a state of not yet fully cooled though the reason thereof has not yet been clarified.

In the apparatus for cooling preformed articles provided by the present invention, the holding means comprises grippers for holding the preformed articles arranged on the rotary conveyer passage maintaining a distance to the surroundings of the blow-formed portions of the preformed articles, and the ring-like flanges of the preformed articles are placed on the upper surfaces of the grippers, or the mouth-and-neck portions thereof are held thereby, so that the preformed articles are reliably held one by one while being conveyed at an increased speed.

The apparatus for cooling preformed articles provided by the present invention comprises conveyer means for conveying the preformed articles through a conveyer passage inclusive of a cooling zone, holding means for holding the preformed articles in at least the cooling zone, and a water tank for cooling the blow-formed portions of the preformed articles conveyed through the cooling zone in the cooling water. Therefore, the preformed articles can be effectively cooled. By shortening the conveying length necessary for cooling the preformed articles, the apparatus for cooling preformed articles can be realized in a small size. In particular, when the conveyer means is a rotary conveyer passage that rotates with the axis of rotation as a center, it is allowed to further decrease the size of the conveyer line in the apparatus for cooling preformed articles.

In the invention, the holding means for holding the preformed articles in the cooling zone comprises gap portions formed maintaining a gap up and down in the pair of right and left endless chains, and ring-like flanges of the preformed articles are held in the gap portions. Namely, flanges of the preformed articles can be held in the gap portions. When submerged in the cooling water in the water tank, the upper surfaces of the gap portions support the preformed articles utilizing the buoyancy. Out of the cooling water, the lower surfaces of the gap portions support the preformed articles utilizing the gravitational action.

In the invention, the traveling speed is differed relative to each other between the right and left conveyers constituted by a pair of right and left endless chains that form conveyer means. This makes it possible to turn the preformed articles, to blow the cooling solution onto the preformed articles or to immerse them in the cooling solution.

The apparatus for cooling preformed articles provided by the present invention comprises a water tank for cooling the formed articles in the cooling water, means for conveying the preformed articles through the water tank and for conveying them out of the water tank, means for correcting the preformed articles conveyed out of the water tank so as to assume the same attitude, and means for removing the cooling water from the preformed articles. Therefore, the preformed articles can be efficiently cooled.

According to the invention, means for removing the cooling water from the preformed articles is air injection means, and the positions of nozzles of the air injection means may be arranged at the centers of openings of the mouth-and-neck portions when the air is to be injected but are arranged deviated from the centers thereof to efficiently remove the cooling water staying in the preformed articles. The nozzles may be inserted in the preformed articles when the air is to be injected.

The above inventions include a circulation pump for supplying the cooling water to the water tank, water-purifying means for removing fouling matter from the cooling water, sterilizing means for sterilizing the cooling water, and temperature-maintaining means for adjusting the temperature of the cooling water. Therefore, the cooling temperature is maintained in the water tank and, besides, the cooling water is purified and is sterilized to save the cooling water.

In the above inventions, the preformed articles are formed by compression-forming a synthetic resin. By using an extrusion-forming machine which makes possible to shorten the residence time of the plasticized resin as compared to that of the injection-forming machine, therefore, formation of acetaldehyde can be decreased, and there can be provided preformed articles of containers having excellent favor property.

According to the method of cooling preformed articles provided by the present invention, the preformed articles as formed by the compression forming, taken out at a high temperature but before being subjected to the blow forming, are cooled by the water. Therefore, the preformed articles can be cooled in a shorter period of time than when the preformed articles are cooled by the air.

BRIEF DESCRIPTION OF THE DRAWINGS

FIG. 9 is a partial perspective view illustrating a cooling liquid blow nozzle member in the apparatus for cooling preformed articles of FIG. 7;

FIG. 10 is a partial perspective view illustrating gas stream blow nozzle members in the apparatus for cooling preformed articles of FIG. 7;

BEST MODE FOR CARRYING OUT THE INVENTION

A first embodiment of the apparatus for cooling preformed articles constituted according to the present invention will be described below in further detail with reference to the accompanying drawings.

Figure 1:
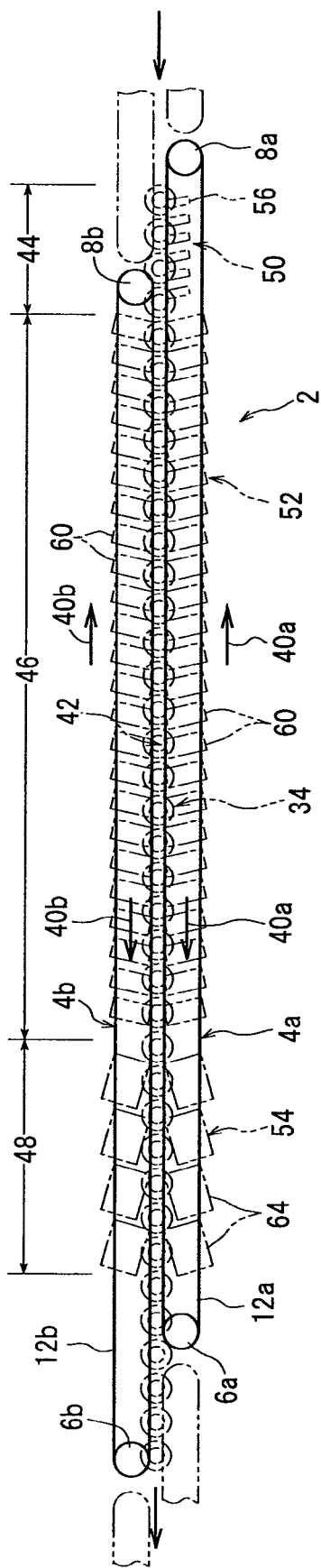
FIG. 1 is a plan view schematically illustrating a first embodiment of an apparatus for cooling preformed articles constituted according to the present invention.
Figure 2:
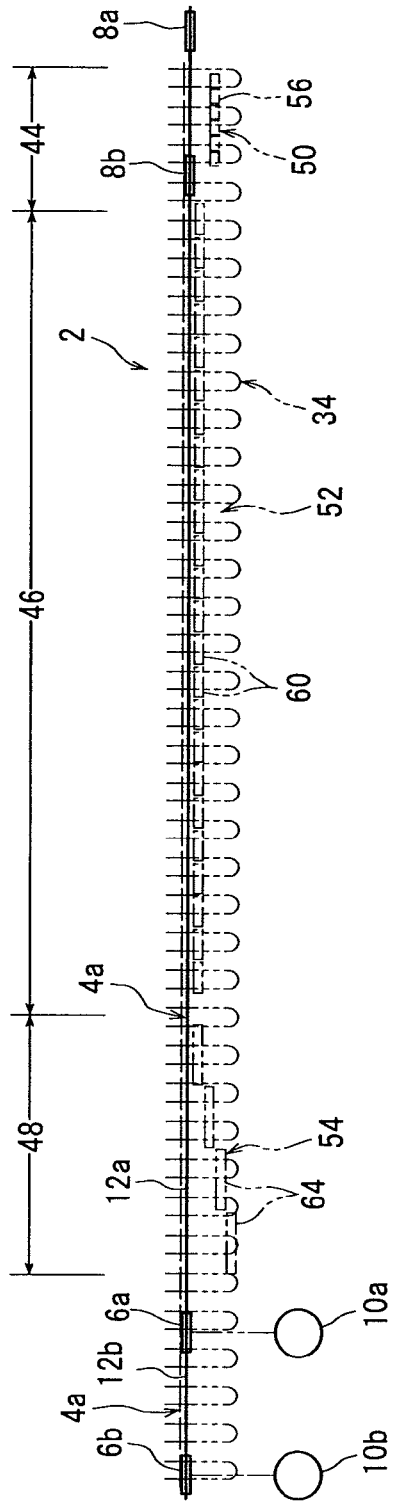
FIG. 2 is a front view schematically illustrating the apparatus for cooling preformed articles of FIG. 1.
Figure 3:
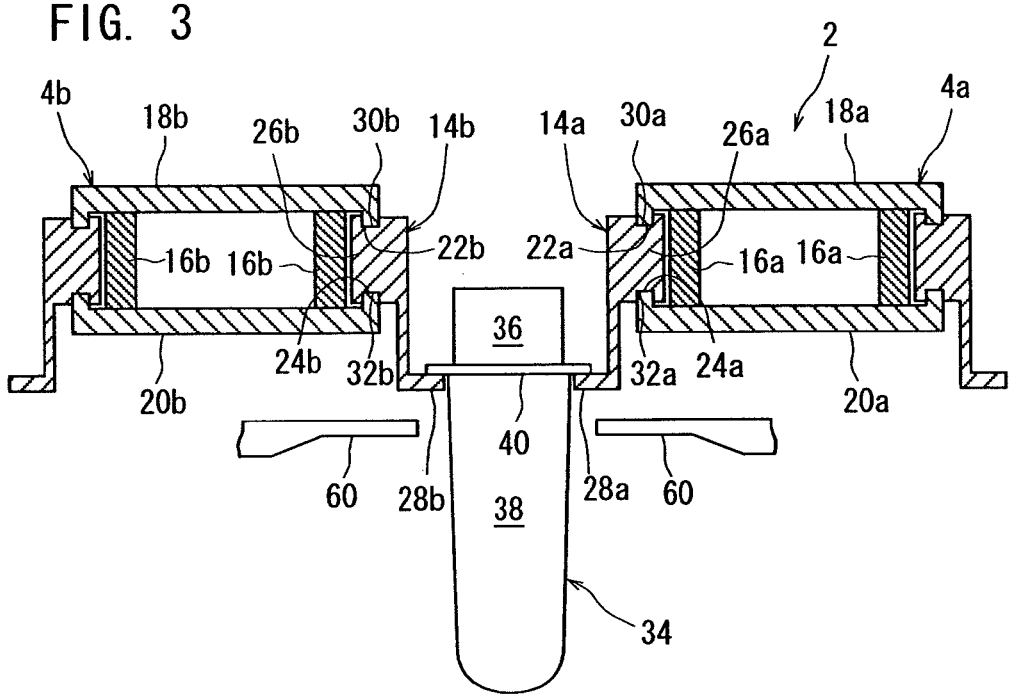
FIG. 3 is a transverse sectional view of the apparatus for cooling preformed articles of FIG. 1.

Referring to FIGS. 1 to 3, the apparatus for cooling preformed articles constituted according to the present invention includes conveyer means 2 which is constituted by a pair of conveyers 4a and 4b arranged maintaining a distance in the transverse direction (up-and-down direction in FIG. 1 or right-and-left direction in FIG. 3). The pair of conveyers 4a and 4b include drive wheels 6a and 6b as well as driven wheels 8a and 8b arranged spaced apart in the direction of conveyance (right-and-left direction in FIGS. 1 and 2 or in a direction perpendicular to the surface of paper in FIG. 3). The drive wheels 6a and 6b as well as the driven wheels 8a and 8b are fitted to rotate about the center axes that extend substantially vertically (direction perpendicular to the surface of paper in FIG. 1 or up-and-down direction in FIG. 3), while the drive wheels 6a and 6b are drivingly coupled to electric motors 10a and 10b. Endless chains 12a and 12b are wrapped round the drive wheels 6a and 6b and round the driven wheels 8a and 8b. The endless chains 12a and 12b are arranged in a direction in which they run and are each constituted by a number of chain members 14a and 14b (FIG. 3) rotatably coupled to each other. Referring to FIG. 3, pairs of stationary members 16a and 16b are fixed between the drive wheels 6a, 6b and the driven wheels 8a, 8b, the pairs of stationary members 16a and 16b extending in parallel in the direction of conveyance. Upper guide members 18a, 18b and lower guide members 20a, 20b are fixed to the pairs of stationary members 16a and 16b. Guide rail portions 22a and 22b are formed protruding downward at both side edges of the upper guide members 18a and 18b that are protruding sideways beyond the pairs of stationary member 16a and 16b. Guide rail portions 24a and 24b are formed protruding upward at both side edges of the lower guide members 20a and 20b that are protruding sideways beyond the pairs of stationary members 16a and 16b. The chain members 14a and 14b have to-be-guided portions 26a and 26b and suspension portions 28a and 28b, respectively. The to-be-guided portions 26a and 26b have upper to-be-guided grooves 30a and 30b formed so as to engage with the guide rail portions 22a and 22b of the upper guide members 16a and 16b, as well as lower to-be-guided grooves 32a and 32b formed so as to engage with the guide rail portions 24a and 24b of the lower guide members 20a and 20b. The suspension portions 28a and 28b extend downward from the lower ends of inner side edges of the to-be-guided portions 26a and 26b and, further, extend sideways toward the insides.

FIG. 3 also illustrates a preformed article 34 that is to be cooled. The preformed article 34 that can be formed by compression-forming or injection-forming a suitable synthetic resin such as polyethylene terephthalate, has a mouth-and-neck portion 36 and a blow-formed portion 38 with bottom continuous to the lower end of the mouth-and-neck portion 36. The mouth-and-neck portion 36 of the preformed article 34 that is shown is of a cylindrical shape and has a flange 40 of a ring-like shape formed at the lower end thereof. The main portion of the blow-formed portion 38 is of the shape of an inverse circular truncated cone of which the outer diameter slightly decreases downward.

If further described with reference to FIGS. 1 to 3, when the electric motors 10a and 10b are energized, the endless chains 12a and 12b are rotated and driven in the directions indicated by arrows 40a and 40b in FIG. 1. The transverse inner running portions of the endless chains 12a and 12b work as conveyer running portions, and the transverse outer running portions are the return running portions. As clearly shown in FIG. 3, the preformed article 34 has its ring-like flange 40 suspended by the conveyer running portions of the endless chains 12a and 12b and, if described in further detail, suspended on the suspension portions 28a and 28b of the chain members 14a and 14b, and is conveyed in the directions indicated by arrows 40a and 40b accompanying the motion of the endless chains 12a and 12b. In the embodiment as will be clearly understood from FIG. 1, the conveyer 4a and the conveyer 4b constituting the conveyer means 2 are slightly displaced in the direction of conveyance; i.e., the upstream end of the conveyer 4a does not cooperate with the conveyer 4b and the downstream end of the conveyer 4b does not cooperate with the conveyer means 4a. As simply illustrated by two-dot chain lines in FIG. 1, the upstream end of the conveyer 4a cooperates with the downstream end of one of the pair of conveyers of the conveying means arranged on the upstream side, and the downstream end of the conveyer 4b cooperates with the upstream end of one of the pair of conveyers of the conveyer means arranged on the downstream side. Thus, the preformed articles 34 to be cooled are conveyed onto the conveying means 2 from the conveying means arranged on the upstream side, are conveyed by the conveyer means 2, and are delivered to the conveyer means arranged on the downstream side. As will be clearly understood from the description appearing later, the preformed articles 34 are effectively cooled while being conveyed by the cooling means 2.

As will be clearly understood from FIG. 1, a conveyer passage 42 for the preformed articles 34 is defined between the pair of conveyers 4a and 4b. In the illustrated embodiment, the conveyer passage 42 for the preformed articles 34 includes a spray zone 44, a cooling zone 46 and a drying zone 48 successively arranged in the direction of conveyance. Spray blow means 50 is arranged in the spray zone 44, cooling liquid blow means 52 is arranged in the cooling zone 46, and gas stream blow means 54 is arranged in the drying zone 48.

Figure 4:
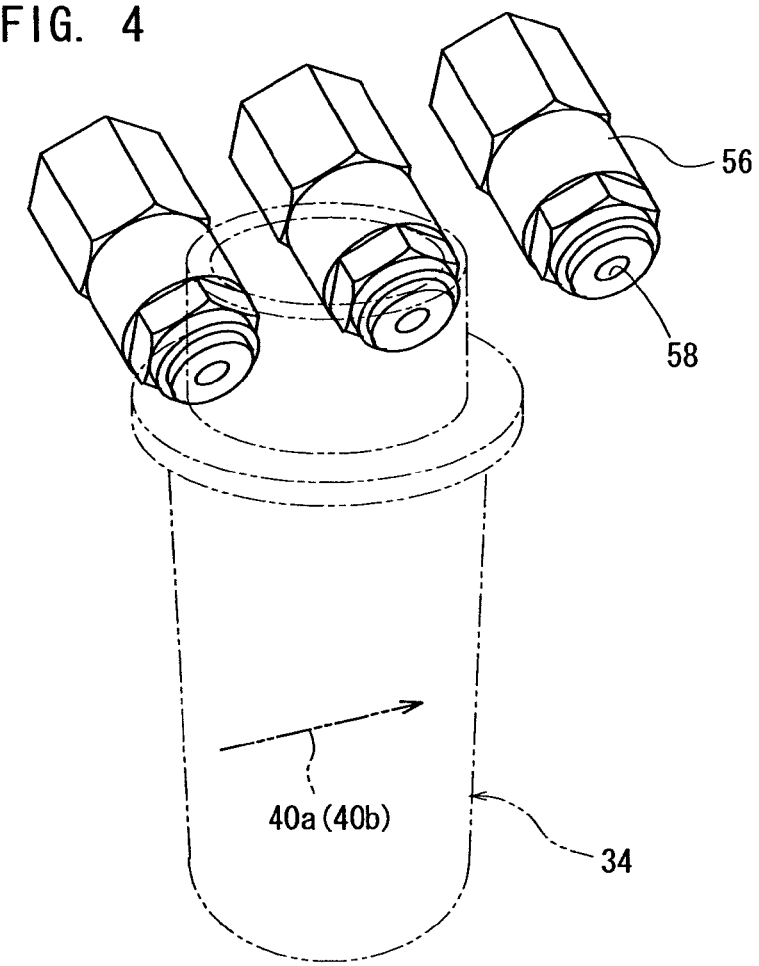
FIG. 4 is a partial perspective view illustrating spray blow nozzle members in the apparatus for cooling preformed articles of FIG. 1.
Figure 5:
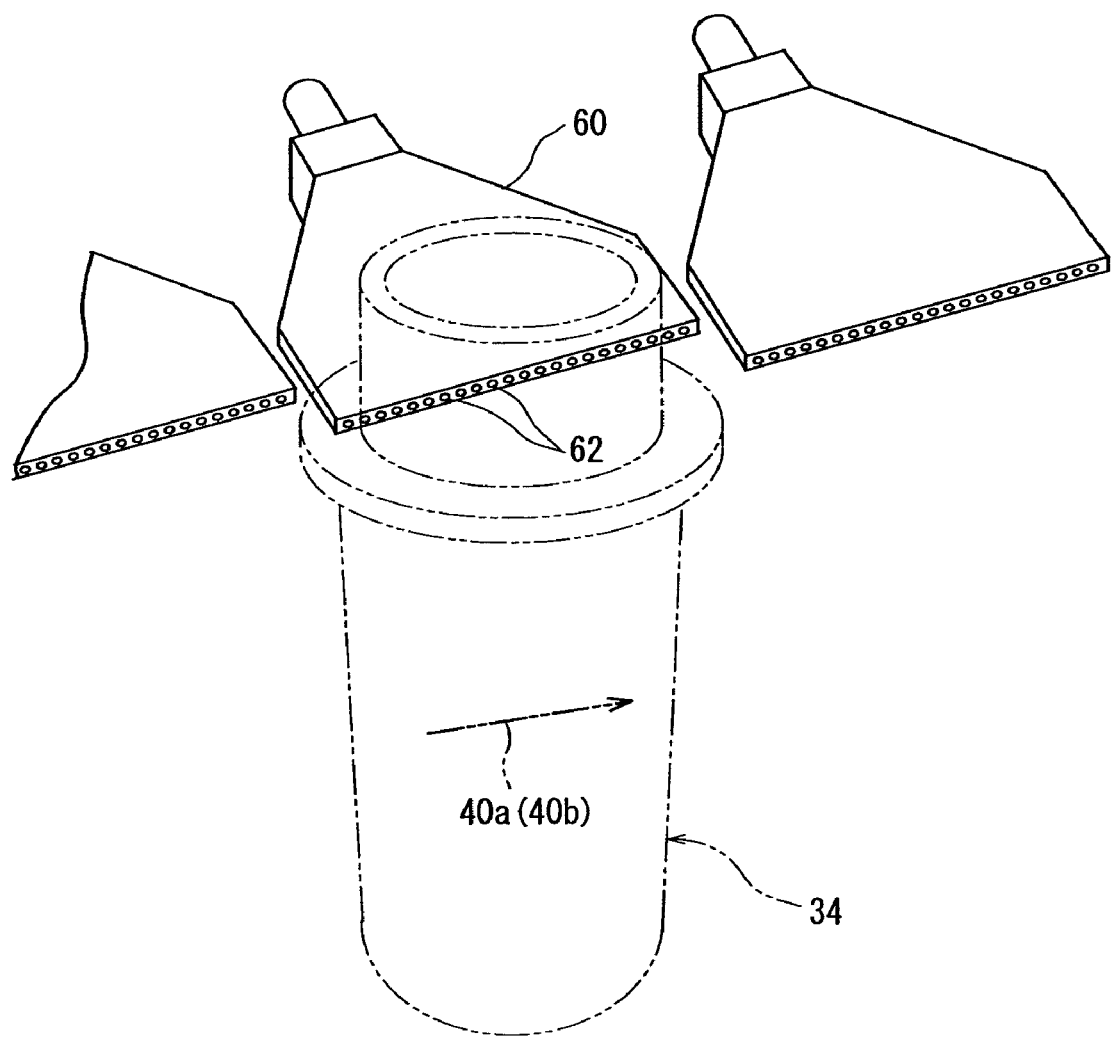
FIG. 5 is a partial perspective view illustrating cooling liquid blow nozzle members in the apparatus for cooling preformed articles of FIG. 1.

As shown in FIGS. 1, 2 and 4, the spray blow means 50 is constituted by a plurality of, or in the illustrated embodiment, five spray blow nozzles 56 arranged on one side of the conveyer passage 42 for the preformed articles 34. As will be clearly understood from FIG. 1, the spray blow nozzles 56 are arranged facing the conveyer passage 42 and are slightly tilted toward the upstream side. A water supply (not shown) which may be the city water is connected to the spray blow nozzles 56 which work to spray the water. The spray is injected from a single injection hole 58 formed at an end of each of them, and is blown to the blow-formed portions 38 of the preformed articles 34 conveyed through the conveyer passage 42. It is desired that the particles constituting the spray have a diameter of 1 to 5 μm and, particularly, 1 to 3 μm to avoid the particles adhered on the blow-formed portions 38 from gathering together to form droplets and, further, to avoid the blow-formed portions 38 of the preformed articles 34 from being cooled by dot regions, so that the surfaces will not become spotted or rugged.

In the embodiment as will be clearly understood with reference to FIGS. 1 to 3 and FIG. 5, the cooling liquid blow means 52 is constituted by a plurality of, or in the illustrated embodiment, twenty-four cooling liquid blow nozzles 60 arranged on each side of the conveyer passage 42 for the preformed articles 34. As will be understood from FIG. 1, the cooling liquid blow nozzles 60, too, are arranged facing the conveyer passage 42 and are slightly tilted toward the upstream side. As clearly shown in FIG. 5, each cooling liquid blow nozzle 60 has a plurality of injection holes 62 arranged in the direction of conveyance. A cooling liquid source (not shown) is connected to the cooling liquid blow nozzles 60 which inject the supplied cooling liquid as a cooling liquid stream from the plurality of injection holes 62 so as to be blown onto the blow-formed portions 38 of the preformed articles 34 conveyed through the conveyer passage 42. The cooling liquid may be the city water of about 25° C. The position of blowing the cooling liquid is desirably the upper ends of the blow-formed portions 38 of the preformed articles 34.

If further described with reference to FIGS. 1 to 3 and FIG. 6, the gas stream blow means 54 in the embodiment is constituted by a plurality of, or in the illustrated embodiment, four air stream blow nozzles 64 arranged on each side of the conveyer passage 42 for the preformed articles 34. As will be understood from FIG. 1, the gas stream blow nozzle members, too, are arranged facing the conveyer passage 42 and are slightly tilted toward the upstream side. As will be understood with reference to FIG. 2, the height for arranging the gas stream blow nozzles 64 gradually decreases toward the downstream side in view of the fact that the cooling liquid adhered on the blow-formed portions 38 of the preformed articles 34 flows downward. If described in further detail, the most upstream gas stream blow nozzle 64 is disposed facing the upper end of the blow-formed portion 38 of the preformed article 34, the gas stream blow nozzle 64 positioned on the downstream side thereof is disposed facing a portion slightly higher than the intermediate portion in the up-and-down direction of the blow-formed portion 38 of the preformed article 34, the gas stream blow nozzle 64 positioned on the downstream thereof is disposed facing a portion slightly lower than the intermediate portion in the up-and-down direction of the blow-formed portion 38 of the preformed article 34, and the most downstream gas stream blow nozzle 64 is disposed facing the lower end of the blow-formed portion 38 of the preformed article 34. As will be clearly understood from FIG. 6, each gas stream blow nozzle 64 has an injection hole 66 slenderly extending in the direction of conveyance. A gas source (not shown) is connected to the gas stream blow nozzles 64 which inject the supplied gas as an air stream from the injection holes 66 thereof so as to be blown onto the blow-formed portions 38 of the preformed articles 34 conveyed through the conveyer passage 42. The gas may be an inert gas or the air of normal temperature.

The actions of the above-mentioned apparatus for cooling preformed articles will be summarized below.

While the preformed articles 34 are conveyed by the pair of conveyers 4a and 4b, the spray is blown to the blow-formed portions 38 of the preformed articles 34 by the spray blow means 50 in the spray zone 44. The present inventors have learned through their experience that blowing the spray onto the blow-formed portions 38 of the preformed articles 34 effectively works to suppress or prevent damage to the blow-formed portions 38 of the neighboring preformed articles 34 caused by the contact among them despite the distance is set to be relatively small to the preformed articles 34 that are subsequently conveyed and, besides, despite the preformed articles 34 are conveyed at a relatively high speed. Though the reason has not been clarified yet, the present inventors presume that the spray covering the blow-formed portions 38 suppress the blow-formed portions 38 of the neighboring preformed articles 34 from coming into contact to an excess degree.

While the preformed articles 34 are conveyed through the cooling zone 46, the cooling liquid is blown to the upper ends of the blow-formed portions 38 of the preformed articles 34 by the cooling liquid blow means 52. The cooling liquid flows down on the blow-formed portions 38, and the preformed articles 34 are cooled very effectively. Next, while the preformed articles 34 are conveyed passing through the drying zone 48, the gas stream is blown to the upper ends gradually down to the lower ends of the blow-formed portions 38 of the preformed articles 34 by the gas stream blow means 54. The cooling liquid adhered on the blow-formed portions 38 is effectively blown away, and the blow-formed portions 38 are dried.

Figure 7:
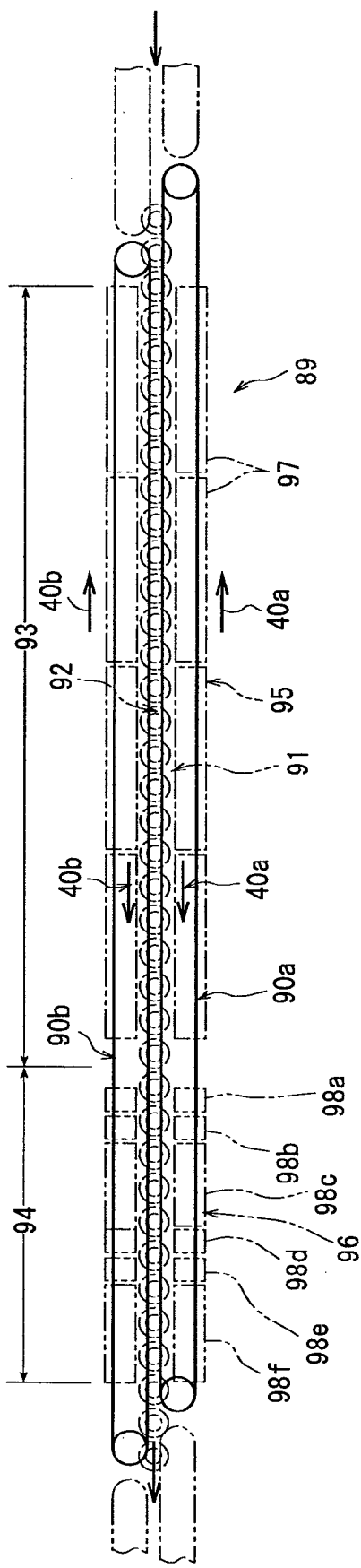
FIG. 7 is a plan view schematically illustrating a second embodiment of an apparatus for cooling preformed articles constituted according to the present invention.
Figure 8:
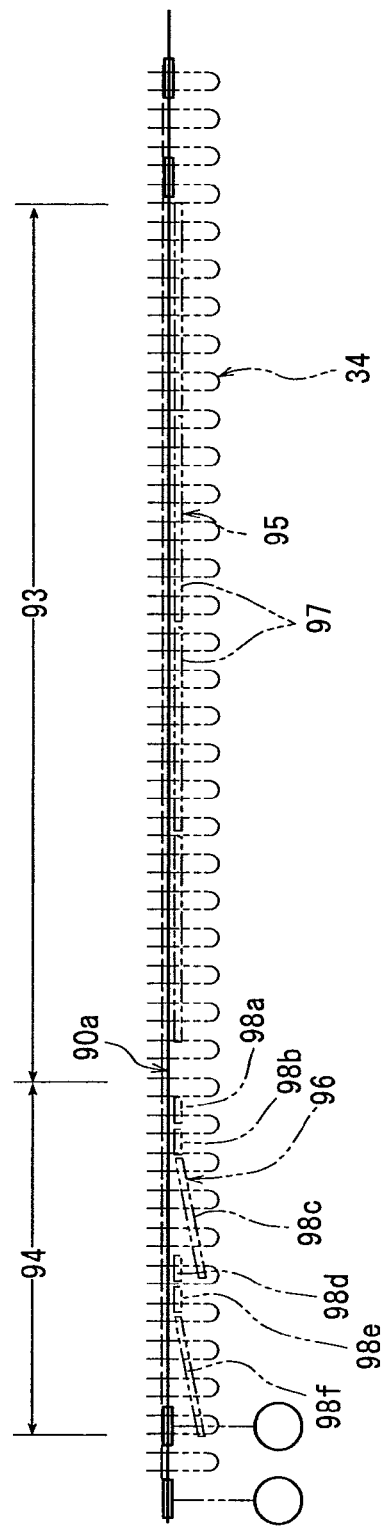
FIG. 8 is a front view schematically illustrating the apparatus for cooling preformed articles of FIG. 7.

FIGS. 7 to 10 illustrate a second embodiment of the apparatus for cooling preformed articles constituted according to the present invention. As shown in FIGS. 7 and 8, this modified embodiment, too, is provided with conveyer means 89 constituted by a pair of conveyers 90a and 90b. The conveyer means 89 may be substantially the same as the conveyer means 2 shown in FIGS. 1 and 2, and a conveyer passage 92 for the preformed articles 34 is defined between the pair of conveyers 90a and 90b. The conveyer passage 92 includes a cooling zone 93 and a drying zone 94 arranged downstream of the cooling zone 93, but does not include any spray zone (therefore, no spray blow means is disposed in the embodiment shown in FIGS. 7 to 10). Cooling liquid blow means 95 is disposed in the cooling zone 93 and gas stream blow means 96 is disposed in the drying zone 94.

As will be clearly understood with reference to FIGS. 7 to 9, the cooling liquid blow means 95 is constituted by a plurality of, or in the illustrated embodiment, four cooling liquid blow nozzles 97 on each side of the conveyer passage 92 for the preformed articles 34. Each cooling liquid blow nozzle 97 has a front surface that extends in parallel with the conveyer passage 92, and a slenderly extending injection hole 97a is formed in the front surface along the conveyer passage 92. A cooling liquid source (not shown) is connected to the cooling liquid blow nozzles 97 which inject the supplied cooling liquid as a cooling liquid stream from a plurality of injection holes 97a so as to be blown onto the blow-formed portions 38 of the preformed articles 34 conveyed through the conveyer passage 92. The cooling liquid may be the city water of about 25° C. The position of blowing the cooling liquid is desirably the upper ends of the blow-formed portions of the preformed articles 34.

If further described with reference to FIGS. 7, 8 and FIG. 10, the gas stream blow means 96 is constituted by a plurality of, or in the illustrated embodiment, six air stream blow nozzles 98a to 98f arranged on each side of the conveyer passage 92 for the preformed articles 34. The gas stream blow nozzles 98a, 98b, 98d and 98e are arranged substantially horizontally. The gas stream blow nozzles 98c and 98f, on the other hand, are extending relatively long in the direction of conveyance and are tilted downward toward the downstream in the direction of conveyance. If described in further detail, as will be clearly understood with reference to FIG. 10, the gas stream blow nozzle 98c is neighboring the gas stream blow nozzle 98b and is extending being tilted from an upstream end thereof positioned substantially at the same height as the air stream blow nozzle 98b down to the downstream end positioned under the gas stream blow nozzle 98d in the direction of conveyance. The gas stream blow nozzle 98f is neighboring the gas stream blow nozzle 98e and is extending being tilted from an upstream end thereof positioned substantially at the same height as the air stream blow nozzle 98e down to the downstream side in the direction of conveyance. Each of the gas stream blow nozzles 98a to 98f has a front surface extending in parallel with the conveyer passage 92, and an injection hole 99 slenderly extending and is formed in the front surface along the conveyer passage 92. The injection holes 99 of the gas stream blow nozzles 98a, 98b, 98d and 98e are arranged facing the upstream ends of the blow-formed portions of the preformed articles 34, and the injection holes 99 of the gas stream blow nozzles 98c and 98f are tilted from the upstream ends corresponding to the upper ends of the blow-forming portions of the preformed articles 34 down to the downstream ends corresponding to the lower ends of the blow-formed portions of the preformed articles 34 in the direction of conveyance. A gas source (not shown) is connected to the gas stream blow nozzles 98a to 98f which inject the supplied gas as an air stream from the injection holes 99 thereof so as to be blown onto the blow-formed portions of the preformed articles 34 conveyed through the conveyer passage 92. The gas may be the air of normal temperature.

In the apparatus for cooling preformed articles shown in FIGS. 7 to 10, the preformed articles 34 are conveyed by the conveyer running portions constituted by the pair of belt conveyers 90a and 90b in a direction indicated by arrows 40a and 40b. While the preformed articles 34 are conveyed through the cooling zone 93, the cooling liquid is blown to the upper ends of the blow-formed portions of the preformed articles 34 by the cooling liquid blow means 95. The cooling liquid flows down on the blow-formed portions, and the preformed articles 34 are cooled very effectively. Next, while the preformed articles 34 are conveyed passing through the drying zone 94, the gas stream is blown to the upper ends gradually down to the lower ends of the blow-formed portions of the preformed articles 34 by the gas stream blow means 96. The cooling liquid adhered on the blow-formed portions is effectively blown away, and the blow-formed portions are dried.

The apparatus for cooling preformed articles according to a third embodiment of the invention will be described below with reference to the drawings.

Figure 11:
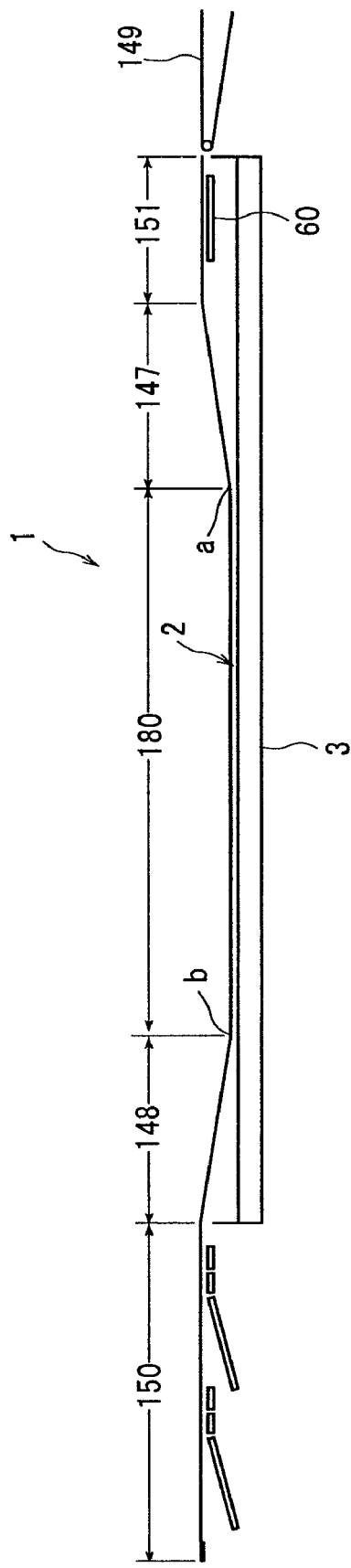
FIG. 11 is a front view schematically illustrating the whole apparatus for cooling preformed articles according to a third embodiment of the invention.
Figure 12:
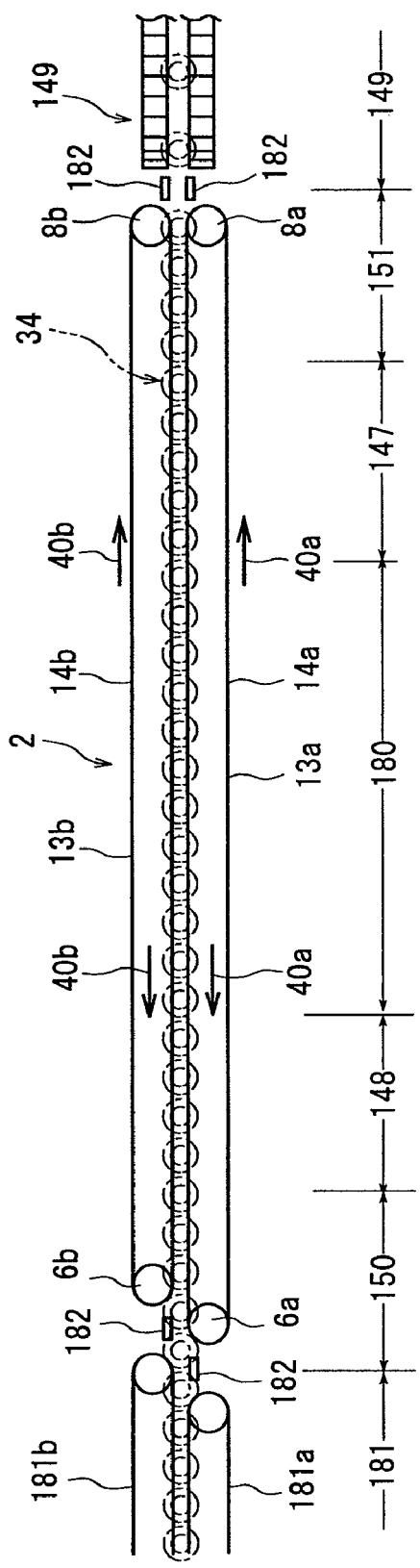
FIG. 12 is a plan view schematically illustrating, on an enlarged scale, the apparatus for cooling preformed articles of FIG. 11.
Figure 13:
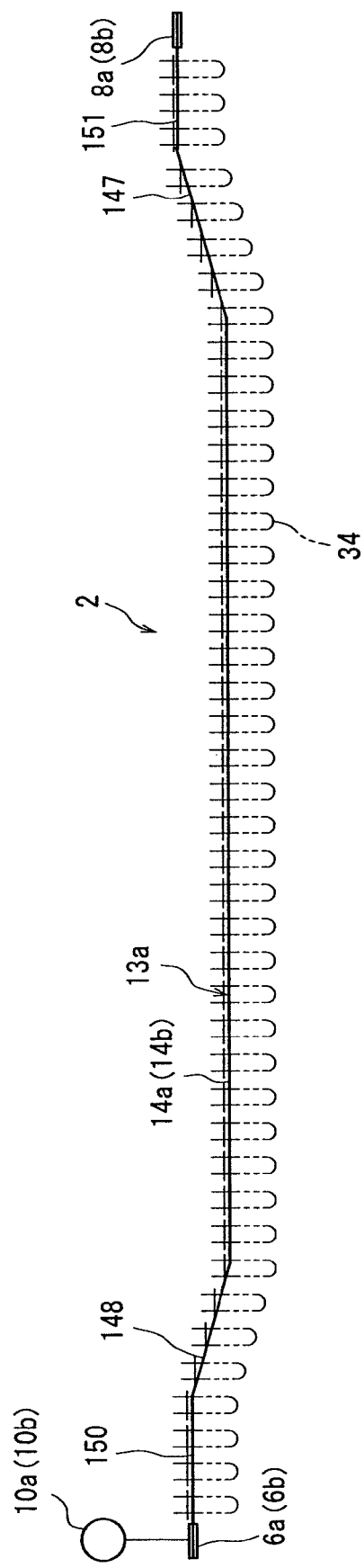
FIG. 13 is a front view schematically illustrating, on an enlarged scale, the apparatus for cooling preformed articles of FIG. 11.

FIG. 11 is a view illustrating the whole apparatus for cooling preformed articles according to the invention, FIG. 12 is a plan view of a conveyer line in a water tank for the preformed articles, and FIG. 13 is a front view thereof.

Referring to FIG. 11, the apparatus 1 for cooling the preformed articles includes a conveyer 2 and a water tank 3. The conveyer 2 is constituted by a pair of endless chains 14a and 14b arranged in the direction of conveyance maintaining a distance in the transverse direction. The endless chains 14a and 14b are provided with drive wheels 6a, 6b and driven wheels 8a, 8b arranged being spaced apart in the direction of conveyance.

The drive wheels 6a, 6b and the driven wheels 8a, 8b are mounted to rotate about center axes that extend substantially vertically (in a direction perpendicular to the surface of paper in FIG. 12), the drive wheels 6a and 6b being drivingly coupled to electric motors 10a and 10b shown in FIG. 13. Endless chains 14a and 14b are wrapped round the drive wheel 6a and the driven wheel 8a and round the drive wheel 6b and the driven wheel 8b. The endless chains 14a and 14b are each constituted by many float-preventing chains 13a, 13b (FIG. 14) arranged in the running direction and coupled to each other so as to be folded up and down and to be turned right and left.

Figure 14:
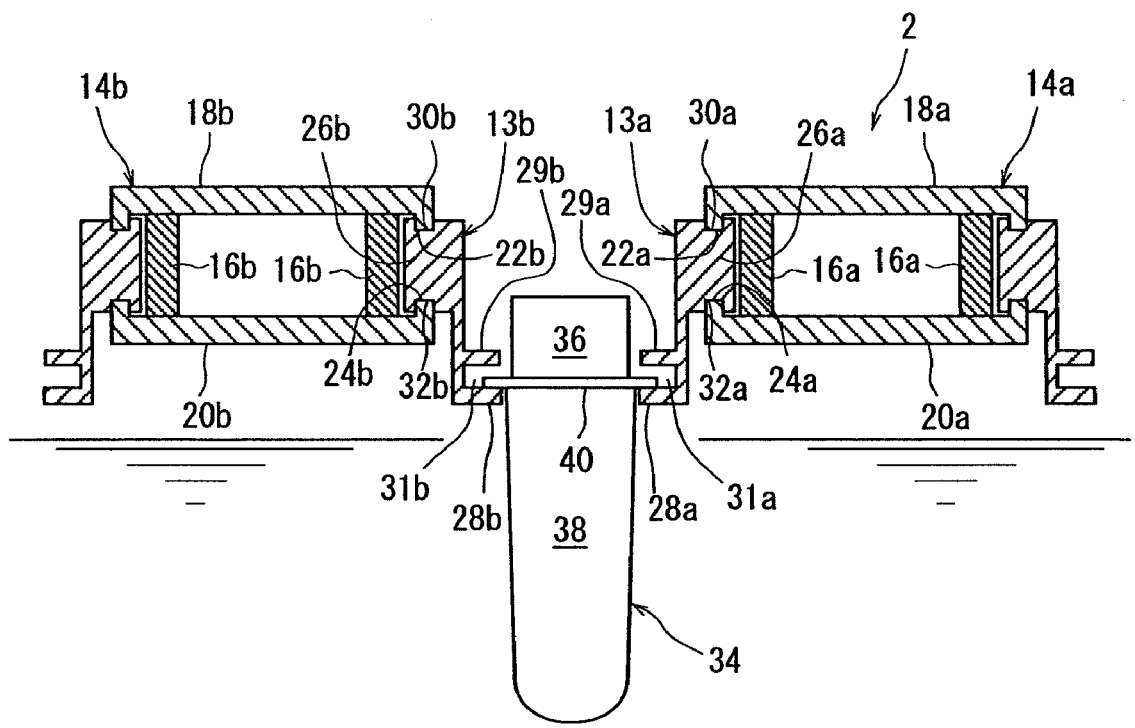
FIG. 14 is a transverse sectional view of the apparatus for cooling preformed articles of FIG. 11.

Referring to FIG. 14, a pair of stationary members 16a are fixed between the drive wheel 6a and the driven wheel 8a so as to extend in parallel in the direction of conveyance. Similarly, another pair of stationary members 16b are fixed between the drive wheel 6b and the driven wheel 8b so as to extent in parallel in the direction of conveyance. Upper guide members 18a, 18b and lower guide members 20a, 20b are fixed to the stationary members 16a and 16b.

The upper guide member 18a and the lower guide member 20a of the one side protrude sideways beyond the pair of stationary members 16a, and guide rail portions 22a are formed along both side edges of the upper guide member 18a so as to protrude downward. Further, guide rail portions 24a are formed along both side edges of the lower guide member 20a so as to protrude upward.

Each of the float-preventing chains 13a has a to-be-guided portion 26a and a suspension portion 28a. The to-be-guided portion 26a has an upper to-be-guided groove 30a formed therein to engage with the guide rail portion 22a of the upper guide member 16a and a lower to-be-guided groove 32a formed therein to engage with the guide rail portion 24a of the lower guide member 20a. The suspension portion 28a extends downward from the lower end of the inner edge of the to-be-guided portion 26a and, further, extends sideways toward the inside like a flange. Further, a float-preventing plate 29a extends sideways toward the inside over the suspension portion 28a maintaining a gap 31a relative thereto.

The upper guide member 18b and the lower guide member 20b of the other side protrude sideways beyond the pair of stationary members 16b, and guide rail portions 22b are formed along both side edges of the upper guide member 18b so as to protrude downward. Further, guide rail portions 24b are formed along both side edges of the lower guide member 20b so as to protrude upward.

Each of the float-preventing chains 13b has a to-be-guided portion 26b and a suspension portion 28b. The to-be-guided portion 26b has an upper to-be-guided groove 30b formed therein to engage with the guide rail portion 22b of the upper guide member 16b and a lower to-be-guided groove 32b formed therein to engage with the guide rail portion 24b of the lower guide member 20b. The suspension portion 28b extends downward from the lower end of the inner edge of the to-be-guided portion 26b and, further, extends sideways toward the inside like a flange. Further, a float-preventing plate 29b extends sideways toward the inside over the suspension portion 28b maintaining a gap 31b relative thereto.

The preformed article 34 shown in FIG. 14 can be formed by compression-forming or injection-forming a suitable synthetic resin such as polyethylene terephthalate. When a polyester resin is formed by using an injection-forming machine, however, the resin is subjected to the steps of melting, kneading and injection at the time of forming the preformed articles from the polyester resin pellets. Namely, the polyester resin is thermally decomposed forming an acetaldehyde which is a decomposition product and causes bad flavor property. Formation of acetaldehyde can be suppressed by various special means. One of them is to form the preformed articles by the compression forming which features a short residence time of the resin suppressing the formation of acetaldehyde.

The preformed article 34 has a shape that includes the mouth-and-neck portion 36 with an opening on the upper side and the blow-formed portion 38 with bottom continuous to the lower end of the mouth-and-neck portion 36. The mouth-and-neck portion 36 of the preformed article 34 is of a cylindrical shape. The flange 40 of a ring-like shape is formed at the lower end of the mouth-and-neck portion 36. The flange 40 is arranged between the suspension portion 28a and the float-preventing plate 29a, and between the suspension portion 28b and the float-preventing plate 29b. The blow-formed portion 38 with bottom is of the shape of an inverse circular truncated cone with its outer diameter slightly decreasing downward.

When the electric motors 10a and 10b shown in FIG. 13 are driven, the endless chains 14a and 14b are rotated and driven in the direction indicated by arrows 40a and 40b in FIG. 12. The transverse inner running portions of the endless chains 14a and 14b work as conveyer running portions, and the transverse outer running portions are the return running portions.

As shown in FIG. 14, the preformed article 34 has its ring-like flange 40 suspended by the conveyer running portions of the endless chains 14a and 14b and, if described in further detail, suspended on the suspension portions 28a and 28b of the float-preventing chains 13a and 13b by utilizing the gravitational action, and is conveyed in the directions indicated by arrows 40a and 40b (arrows of the transverse inner running portions or leftward on the surface of the paper in FIG. 12) accompanying the motion of the endless chains 14a and 14b.

Figure 15:
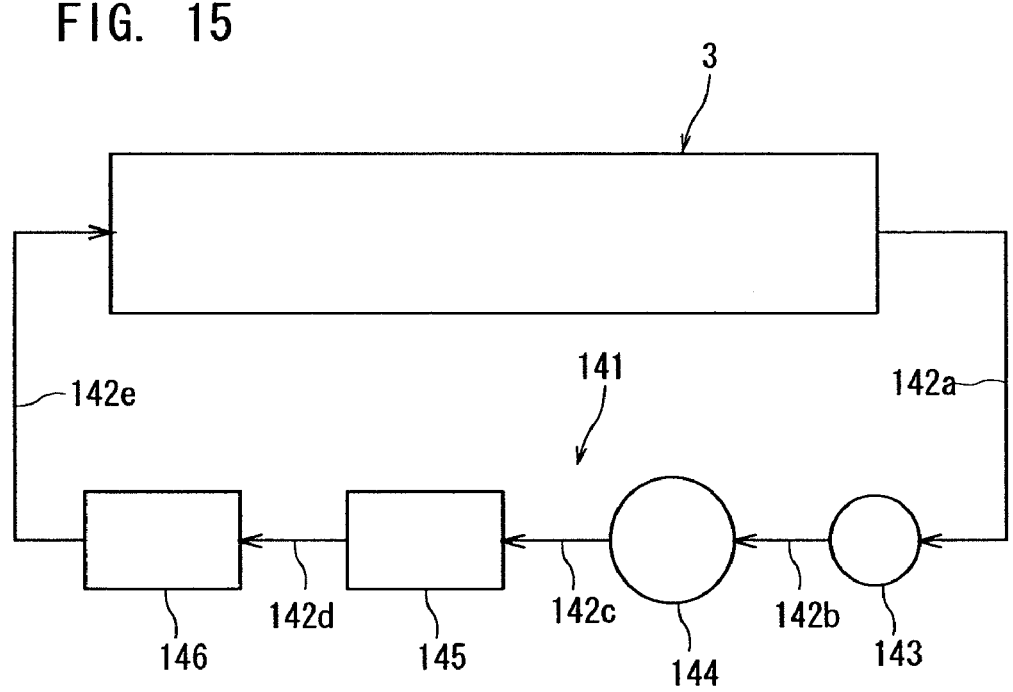
FIG. 15 is a diagram schematically illustrating a water tank in the apparatus for cooling preformed articles of FIG. 11.

Referring to FIG. 14, the water tank 3 is filled with the cooling water under the conveyer 2, and the surface of the water is close to the flange 40 of the preformed article 34. As shown in FIG. 15, the water vessel 3 is equipped with a cooling water circulation facility 141. The cooling water circulation facility 141 is connected to a circulating pump 143 through a pipe 142a starting from the water tank 3. The circulating pump 143 pumps the cooling water in the cooling water circulation facility 141 with pressure so as to be circulated. The circulating pump 143 is connected to a water purifying unit 144 through a pipe 142b. The water purifying unit 144 has a 6 μm-mesh filter provided in the passage of the cooling water. The water purifying unit 144 is connected to a sterilizing vessel 145 through a pipe 142c, and a UV lamp for sterilization is arranged in the interior of the sterilizing vessel 145. The sterilizing vessel 145 is connected to a temperature-maintaining unit 146 through a pipe 142d. A heat exchanger is disposed in the temperature-maintaining unit 146 which is connected to the water tank 3 through a pipe 142e. Thus, the cooling water circulates through water tank 3, circulating pump 143, water purifying unit 144, sterilizing vessel 145 and temperature-maintaining unit 146, and returns back to the water tank 3. The cooling water circulation facility 141 is arranged in the above first embodiment as well as in the above second embodiment, is provided under the conveyer passage, and circulates the cooling water recovered from the water tank 3 which plays the role of a recovery tray through pumping, purification, sterilization and temperature control.

Referring to FIG. 11, a descending portion 147 is provided on the upstream of the conveyer 2 and terminates at a connection portion a, and a spray conveyer portion 151 is provided neighboring thereto on the upstream of the descending portion 147. Spray blow nozzles 56 are arranged in the spray conveyer portion 151.

As shown in FIG. 4, a plurality of spray blow nozzles 56 are provided on one side of the spray conveyer portion 151. A water supply (not shown) which is the city water is connected to the spray blow nozzles 56 which work to spray the water. The spray is injected from a single injection hole 58 formed at an end of each of them, and is blown to the blow-formed portions 38 of the preformed articles 34 conveyed through the spray conveyer portion 151.

A conveyer 149 is arranged on the upstream of the spray conveyer portion 151 to convey the preformed articles 34 formed by using a compression-forming machine or an injection-forming machine (not shown) into the water tank 3. An ascending portion 148 of which the end side is upwardly directed is provided on the downstream of the conveyer 2, and a drain conveyer portion 150 is connected to the downstream of the ascending portion 148. The descending portion 147 and the ascending portion 148 are constituted by guiding the stationary members 16a and 16b in the form of, for example, a dish as viewing from the front as shown in FIG. 11. Further, the endless chains 14a and 14b can be folded up and down to smoothly convey the preformed articles 34. Here, as shown in FIG. 12, dead plates 182 are arranged at a connection portion between the conveyer 149 and the spray blow conveyer portion 151 and at a connection portion between the drain conveyer portion 150 and a conveyer line 181 of the next step, so as to work as guide members.

Figure 6:
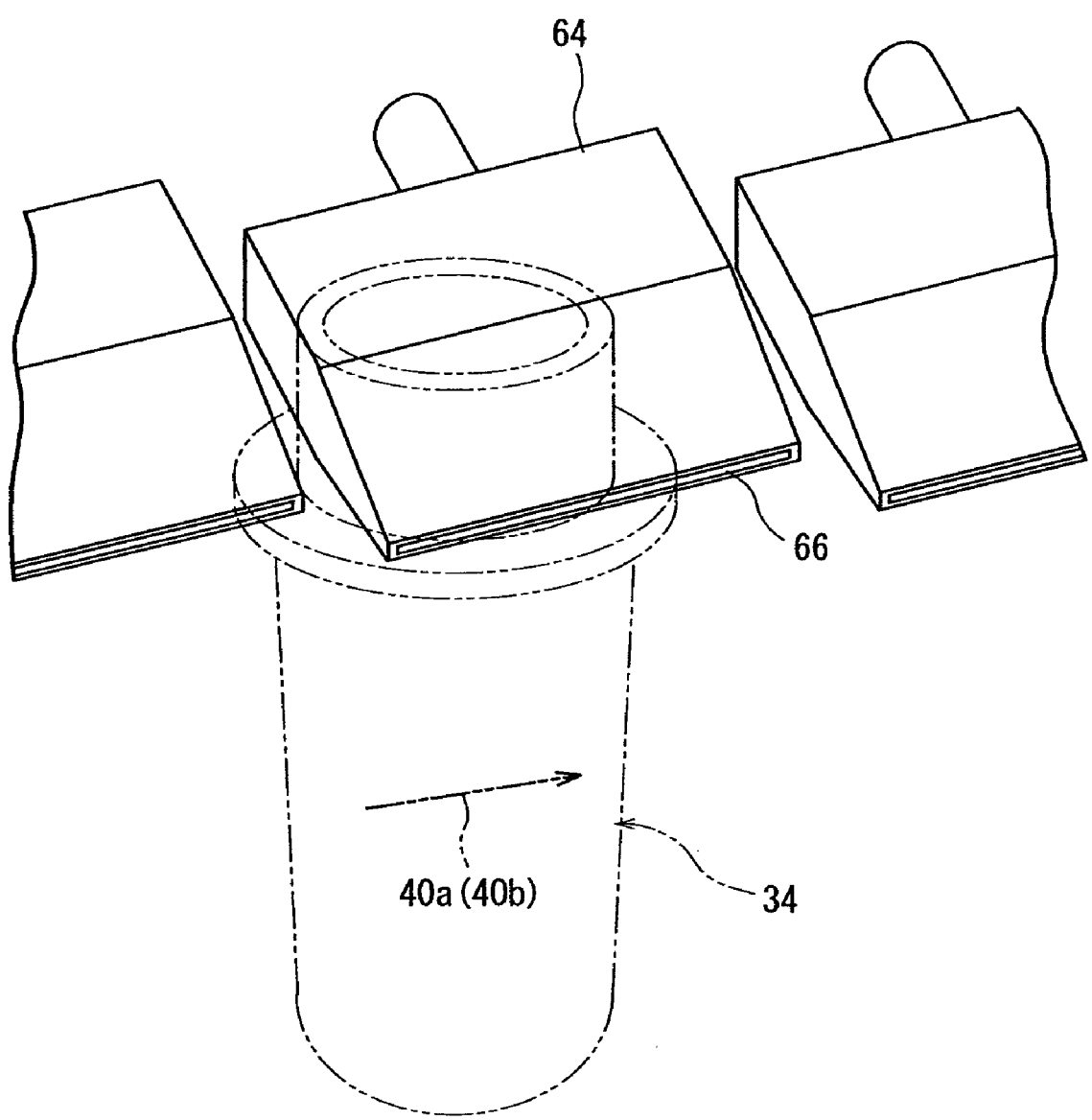
FIG. 6 is a partial perspective view illustrating gas stream blow nozzle members in the apparatus for cooling preformed articles of FIG. 1.

A plurality of air nozzles 64 are arranged in the drain conveyer portion 150 as shown in FIG. 6. Each air nozzle 64 has an injection port 66 slenderly formed in the direction of conveyance, the end of the injection port 66 facing the outer peripheral surface of the preformed articles 34. A gas source (not shown) is connected to the air nozzles 64. The gas may be an inert gas in addition to the air.

Next, described below is the action of the apparatus for cooling preformed articles of the embodiment.

Referring to FIG. 11, the preformed articles 34 formed by using a compression-forming machine or the like machine but before being blow-formed are conveyed by the conveyer 149 up to the water tank 3. The preformed articles 34 are conveyed by the conveyer 149 at a high speed and, therefore, pass through the connection portion between the conveyer 149 and the spray conveyer portion 151 due to the force of inertia thereof. In the spray conveyer portion 151, the distance among the preformed articles 34 being conveyed is shortened since the speed therein is slower than the speed of the conveyer 149. In the spray conveyer portion 151, further, the spray is blown to the outer peripheral surfaces of the blow-formed portions 38 of the preformed articles 34 from the spray blow nozzles 56 (see FIG. 4) while the preformed articles 34 are being conveyed. A blow of the spray onto the blow-formed portions 38 of the preformed articles 34 effectively works to suppress or prevent damage to the blow-formed portions 38 of the neighboring preformed articles 34 caused by the contact among them despite the distance is set to be relatively small to the preformed articles 34 that are subsequently conveyed and, besides, despite the preformed articles 34 are conveyed at a relatively high speed. It is desired that the particles constituting the spray have a diameter of 1 to 5 μm and, particularly, 1 to 3 μm to avoid the particles adhered on the blow-formed portions 38 from gathering together to form droplets and, further, to avoid the blow-formed portions 38 of the preformed articles 34 from being cooled by dot regions, so that the surfaces will not become spotted or rugged.

In the descending portion 147 as shown in FIG. 14, the flange 40 of the preformed article 34 is arranged between the suspension portion 28a and the float-preventing plate 29a of one float-preventing chain 13a and between the suspension portion 28b and the float-preventing plate 29b of the other float-preventing chain 14b. In the descending portion 47, the flange 40 is supported on the upper surfaces of suspension portions 28a, 28b of the float-preventing chains 13a, 13b. Through the descending portion 147, the preformed articles 34 are conveyed to a water-immersion portion 180 (see FIG. 11). The preformed articles 34 are conveyed close to the surface of the cooling water and approaches the connection point a; i.e., the preformed articles 34 approaches the surface of water in the water tank 3.

Figure 16:
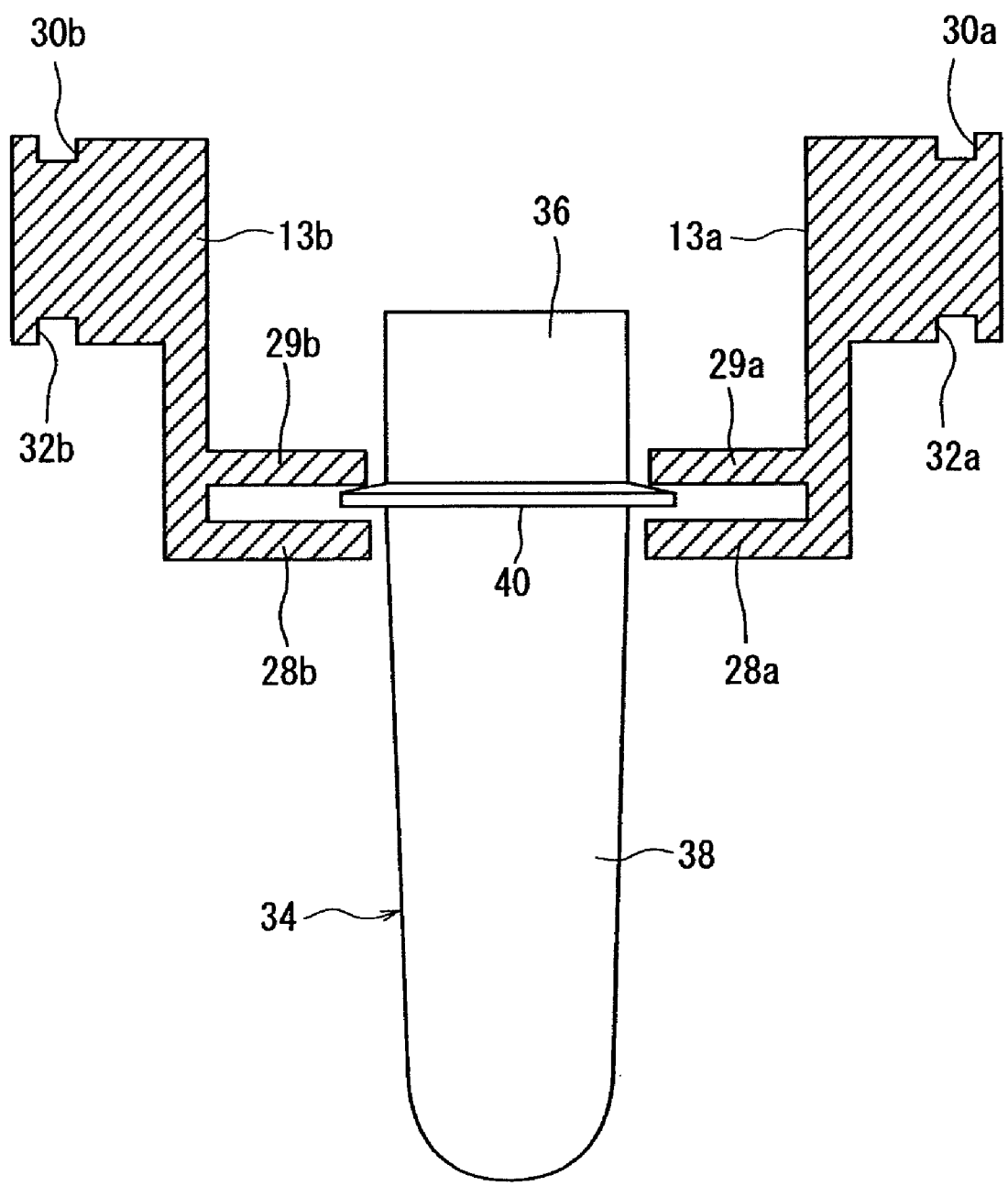
FIG. 16 is a transverse sectional view illustrating a state where the preformed article of FIG. 14 is prevented by float-preventing plates from floating due to buoyancy.

The bottom of the blow-formed portion 38 with bottom of the preformed article 34 of the form of a container comes in contact with the surface of the water; i.e., the preformed article 34 is forced to be submerged in the water. Due to the buoyancy, the preformed article 34 is lifted up (see FIG. 16). Namely, due to the buoyancy, the preformed article comes in contact with the float-preventing plates 29a, 29b positioned over the flange 40, and is limited from floating up any more. The blow-formed portion 38 with bottom of the preformed article 34 is gradually submerged. In the water-immersion portion 180 arranged in the horizontal direction, the blow-formed portion 38 is maintained submerged up to the lower part of the flange 40 and is maintained at the same height.

While being conveyed in the water-immersion portion 180, the flange portion 40 of the preformed article 34 is limited by the float-preventing plates 29a and 29b from moving upward. Therefore, the preformed article 34 maintains a stable upright attitude due to buoyancy, is conveyed toward the downstream side in this state, and is cooled by the cooling water.

After cooled in the water tank 3, the preformed article 34 is handed over to the ascending portion 148 at a boundary point which is a connection portion b (see FIG. 11) between the water-immersion portion 180 and the ascending portion 148. In the ascending portion 48, the preformed article 34 is conveyed upward and goes over the surface of the water where no buoyancy works. Therefore, the flange 40 is supported in a state of being placed on the suspension portions 28a and 28b (see FIG. 14).

In the drain conveyer portion 150, the cooling water adhered to the preformed articles 34 is blown away by the air nozzles 64 shown in FIG. 6. Referring to FIG. 12, the preformed articles 34 are conveyed from the drain conveyer portion 150 to the conveyer 181 of the next step. At the connection portion, however, the drive rollers 6a and 6b are offset back and forth. Despite of being conveyed at a low speed, therefore, the preformed article 34 engages with the endless chain 14a or with a conveyer belt 181b protruding rearward from the conveyer 181 of the next step, and is transferred onto the conveyer 181. Thus, the preformed articles 34 are cooled in a short period of time, and are collected and stored in the next step, or are heated again so as to be blow-formed.

It is desired that the cooling water in the water tank 3 flows from the upstream to the downstream to adjust the speed of conveying the preformed articles, so that the cooling water will not become a resistance against conveying the preformed articles.

In the above first to third embodiments, the right and left traveling speeds are differed between the pair of right and left conveyers 4a and 4b, belt conveyers 90a and 90a and in the conveyer 2, enabling the preformed articles to be conveyed while being rotated so as to be uniformly cooled in the cooling zone. In the first and second embodiments in which the cooling liquid is allowed to be blown to the preformed articles from the transverse direction only, the above constitution is more preferred. By setting the same constitution in the spray zone 44, too, the spray can be blown to the whole periphery of the preformed articles, which is desirable.

Next, a fourth embodiment of the invention will be described with reference to the drawings.

Figure 17:
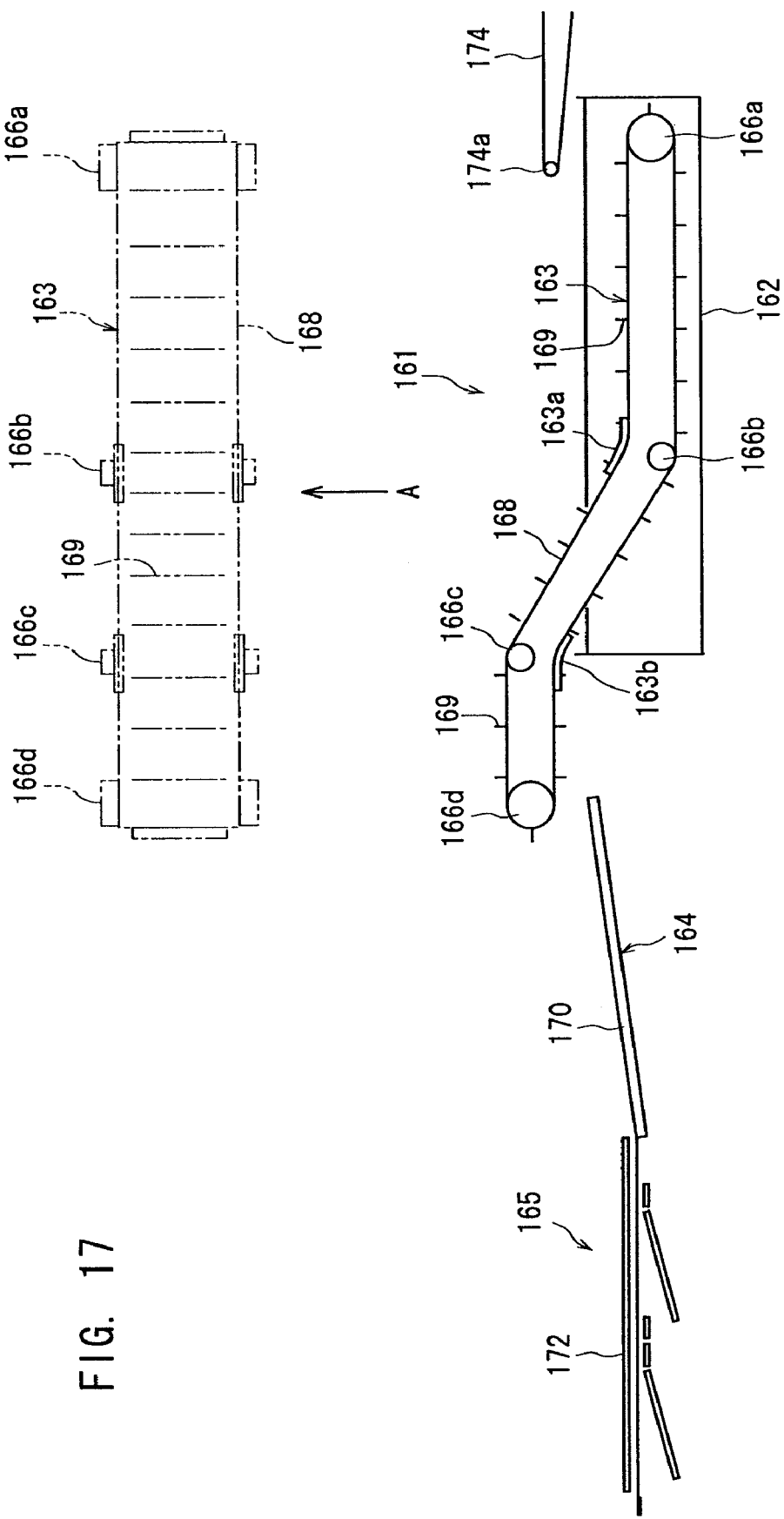
FIG. 17 is a front view schematically illustrating the whole apparatus for cooling preformed articles according to a fourth embodiment of the invention.

An apparatus 161 for cooling preformed articles shown in FIG. 17 (imaginary lines shown double-dash chain line as viewed from an arrow therein are drawing a plan view of a conveyer belt) includes a water tank 162, a conveyer 163, an aligning conveyer line 164 and a drain line 165. The conveyer 163 has one end thereof (upstream side) provided on the bottom of the water tank 162 and has the other end thereof (downstream side) arranged outside the water tank 162. The conveyer 163 is provided with a plurality of rollers 166a to 166d, and the circumference thereof is wrapped with a conveyer belt 168. Belt guides 163a and 163b are provided at the folding portions of the conveyer belt. A plurality of partitioning plates 169 are arranged along the circumference of the conveyer belt 168 maintaining a distance in the circumferential direction of the conveyer belt 168, the partitioning plates 169 being erected at right angles with the conveyer surface of the conveyer belt 168 and are extending over the whole width of the conveyer surface. The height of the partitioning plates 169 is such that the preformed articles 34 can be conveyed.

The water tank 162 includes the cooling water circulation facility comprising the circulating pump 143, water purifying unit 144, sterilizing vessel 145 and temperature-maintaining unit employed by the third embodiment shown in FIG. 15, and is capable of adjusting the temperature and sterilizing the cooling water.

Figure 18:
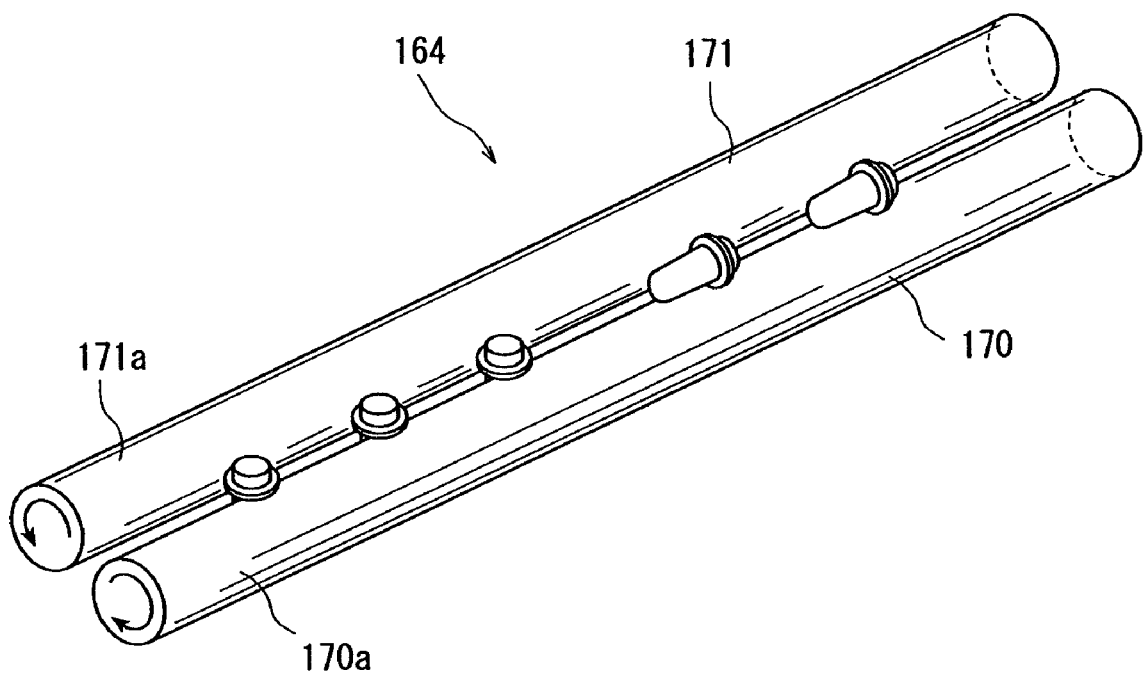
FIG. 18 is a perspective view of guide shafts of an aligning conveyer line in the apparatus for cooling preformed articles of FIG. 17.
Figure 19:
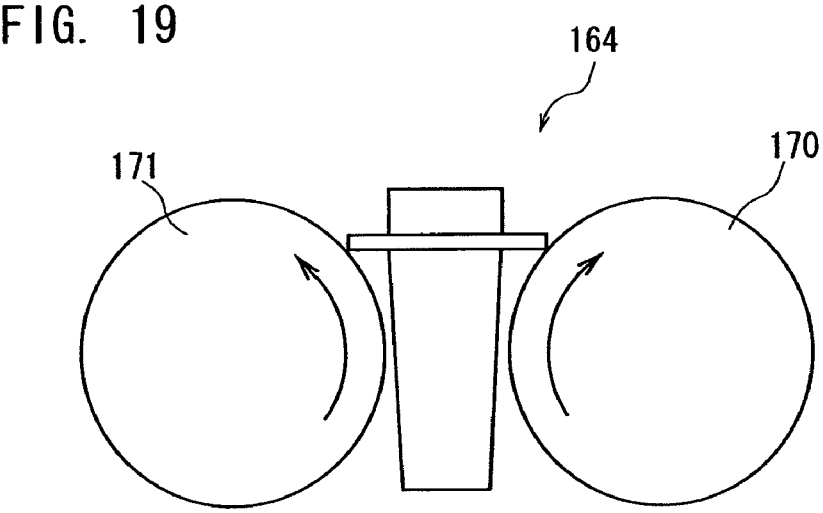
FIG. 19 is a sectional view along the line X-X in FIG. 18.

An aligning conveyer line 164 is provided just under the downstream end of the conveyer 163. The aligning conveyer line 164 is such that the two guide shafts 170 and 171 that are becoming slightly narrow toward the ends 170a, 171a thereof (see FIG. 18) are so arranged that the gap therebetween becomes slightly broad toward the downstream, the gap being greater than the diameter of the blow-formed portion 38 of the preformed article but smaller than the outer diameter of the ring-like flange 40 (gap of a width through which the flange 40 cannot pass through). The guide shafts 170 and 171 are arranged being so tilted that the downstream side thereof becomes low in the direction of conveyance. The guide shafts 170 and 171 are forming a mild screw shape on the outer peripheral surfaces thereof, and are rotated in the opposite directions as shown (see FIGS. 18 and 19).

The preformed article 34 is heavier on the side of the blow-formed portion 38 than on the side of the mouth-and-neck portion 36 with the flange 40 as a reference. When the preformed article 34 is being conveyed, therefore, the blow-formed portion 38 only passes through the gap. As the blow-formed portion 38 passes through the gap, the preformed article 34 assumes an upright attitude, whereby the bottom of the blow-formed portion 38 is directed downward and the flange 40 is supported by the peripheral surfaces on the upper side of the guide shafts 170 and 171. The guide shafts 170, 171 are arranged in parallel in at least one or more pairs.

Figure 20:
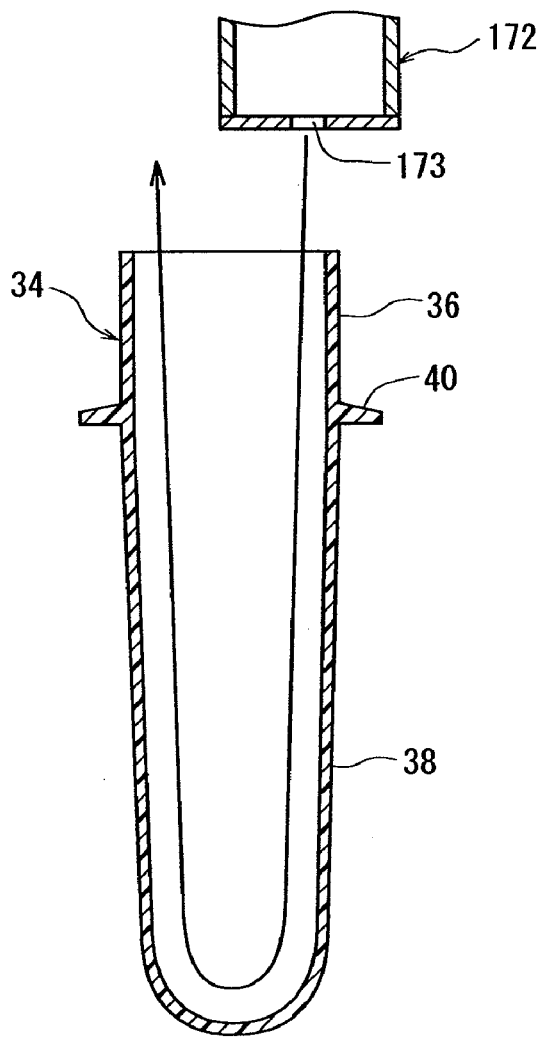
FIG. 20 is a sectional view illustrating a state where the air is injected into the preformed article from an injection slit of an injection device in the apparatus for cooling preformed articles of FIG. 17.

On the drain line 165, the preformed articles 34 are conveyed in an erected attitude, and an injection device 172 is arranged on the drain line 165 (FIGS. 17 and 20). The injection device 172 is arranged in a direction in which the preformed articles 34 are conveyed, and an injection slit 173 is formed in a lower portion thereof along the direction in which the preformed articles 34 are conveyed. The injection slit 173 is arranged facing the openings of the mouth-and-neck portions 36 of the preformed articles 34 and, in a preferred embodiment, is arranged at upper positions of the openings deviated outwards from the centers thereof.

A conveyer 174 is arranged on the upstream of the conveyer 163 to convey the preformed articles 34 formed by the compression-forming machine or the injection-forming machine (not shown) into the water tank 162. An end 174a of the conveyer 174 is protruding inward beyond the end of the water tank 162 in the direction in which the preformed articles 34 are conveyed. The preformed articles 34 must fall on the conveyer 163 in the water vessel 162 from the conveyer 174. Therefore, a guide member (net, plate member, etc.) is desirably provided in the water tank 162 so that the preformed articles 34 reliably falls on the conveyer 163.

The action of the fourth embodiment of the invention will be described next.

The preformed articles 34 conveyed onto the conveyer 174 fall on the water tank 162 from the end 174a of the conveyer 174. Then, the longitudinally elongated preformed articles 34 float lying on the surface of the cooling water in the water tank 162. As the cooling water enters through the openings of the mouth-and-neck portions 36, however, the preformed articles 34 submerge under the surface of the water successively. The conveyer 163 is arranged under the surface of the water, and the preformed articles 34 are fed onto the conveyer belt 168 which is provided with partitioning plates 169. Being guided by the partitioning plates 169, therefore, the preformed articles 34 ascend on the conveyer 163 while being cooled by the cooling water. By taking the temperature of the cooling water and the time for cooling the preformed articles 34 by the cooling water into consideration, the conveying speed of the conveyer 163 is so set that the temperature of the preformed articles 34 is, for example, 60° C. at an end (above near the roller 166d) of the conveyer 163. After having emerged out of the cooling water, the preformed articles 34 arrive at the end of the conveyer 163 and are successively fed onto the aligning conveyer line 164. On the aligning conveyer line 164, the preformed articles 34 are nearly lying down and are arranged between the guide shafts 170 and 171 due to the gravitational action. Here, with the flanges 40 as fulcrums, the blow-formed portions 38 with bottom which are heavy and are becoming narrow toward the end enter into the gap between the guide shafts 170 and 171 and, thereafter, assume the upright attitude. The cooling water that has entered into the preformed articles 34 while being cooled in the water tank 162 is mostly drained in a state when they fell sideways on the aligning conveyer line 164.

Next, the preformed articles 34 that have acquired the upright attitude on the aligning conveyer line 164 are conveyed just under the injection device 172, and the air is injected from the upper injection slit 173 into the lower blow-formed portions 38 with bottom. Since the injection slit 173 is offset from the centers of the preformed articles 34 as shown in FIG. 20, the air is inverted along a curved surface formed in the bottom of the blow-formed portions 38 with bottom, and flows out while coming in contact with the inner peripheral walls. Therefore, the cooling water staying in the bottoms of the blow-formed portions 38 with bottom is injected out of the preformed articles 34 together with the air to accomplish the drying.

Next, a fifth embodiment of the invention will be described with reference to the drawings.

Figure 21:
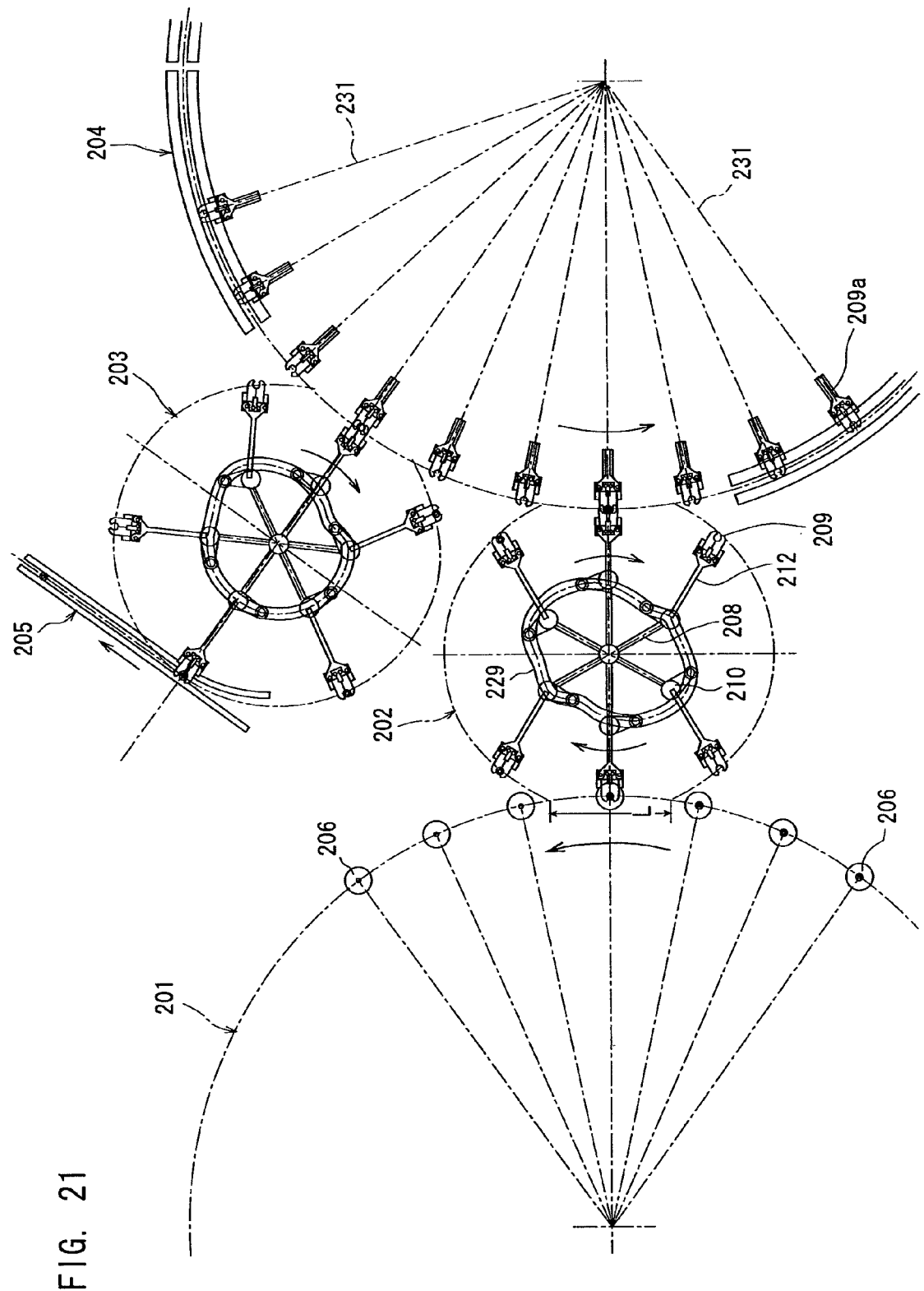
FIG. 21 is a plan view schematically illustrating the periphery of the apparatus for cooling preformed articles according to a fifth embodiment of the invention.

FIG. 21 illustrates part of a preformed article compression-forming machine 201, hand-over units 202 and 203 for the preformed articles on the upstream side and on the downstream side, a preformed article cooling/drying unit 204, and a conveyer 205.

The compression-forming machine 201 rotates so that a plurality of metal molds 206 successively moves along a circular orbit. The formed article hand-over unit 202 on the upstream side comprises a plurality of (six) rotary arms 208 that can be rotated about an axis of rotation maintaining a distance being driven by a motor that is not shown. Grip units 209 are attached to the ends of the rotary arm 208.

Figure 22:
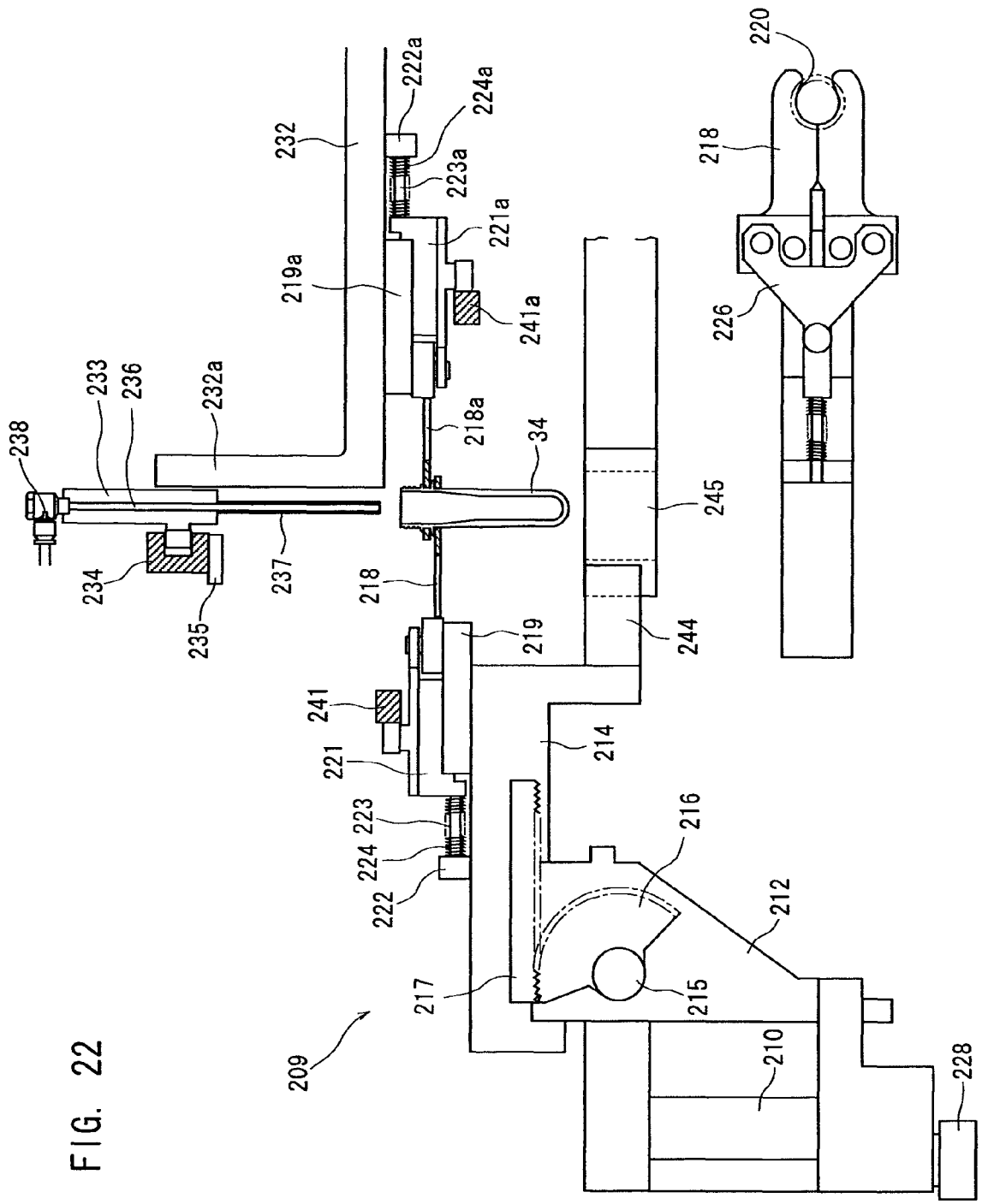
FIG. 22 is a side view illustrating a unit for handing over the preformed articles on the upstream side and a portion for handing the preformed articles over to a cooling/drying unit.

The grip unit 209 is illustrated on the left side in FIG. 22. The grip unit 209 has a swing shaft 210 disposed on the side of the proximal end (arm) thereof with its axis heading in the up-and-down direction permitting the grip unit 209 to swing with respect to the rotary arm 208 as shown in FIG. 21. The swing shaft 210 is provided with a swing arm 212 which has a slide block 214 that extends in the radial direction of the swing turn of a grip 218. The slide block 214 is allowed to slide enabling the grip 218 to move forward or back in the radial direction thereof.

Next, a slide mechanism of the slide block 214 will be described.

Figure 26:
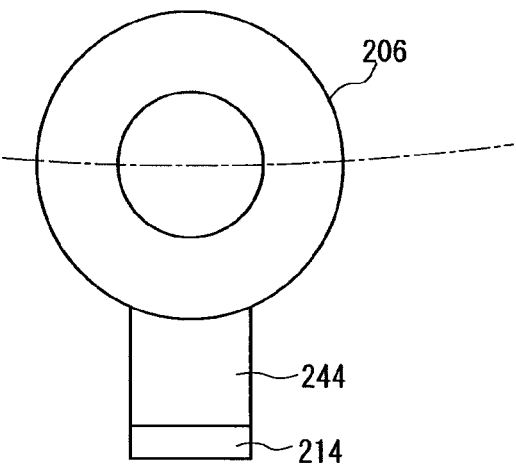
FIG. 26 is a plan view illustrating a retreating motion in relation to a metal mold in a slide block shown in FIG. 21.

The swing arm 212 is provided with a rotary shaft 215 that penetrates through the swing arm 212 in a horizontal direction, and a fan-shaped pinion gear 216 is attached to the rotary shaft 215. The pinion gear 216 meshes with a rack 217 that is fixed to the slide block 214. The rack 217 is so disposed as to move in a horizontal direction and in a radial direction of the swing turn of the grip 218. Here, the rotary shaft 215 is connected to a torsion spring that is not shown, or is linked to an air cylinder or a spring via a pinion-rack structure (not shown) arranged on the back surface side of the grip unit 209 shown in FIG. 22. The rotary shaft 215 is so urged that the grip unit 209 is headed toward the front end thereof. Referring to FIG. 26, at the time of handing over the preformed article 34 from the compression-forming machine 201, a guide block 244 provided under the slide block 214 is limited by being contacted to the compression-forming metal mold 206, so that the slide block 214 retreats (see an orbit X in FIG. 23) and that the grip unit 209 is positioned.

Figure 27:
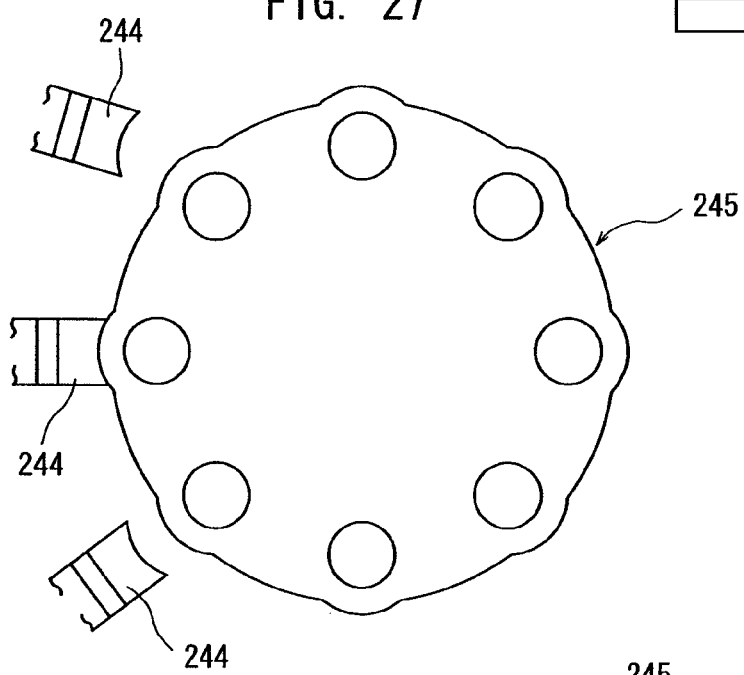
FIG. 27 is a plan view illustrating a whole elongation-limiting block provided in the cooling/drying unit shown in FIG. 21.
Figure 28:
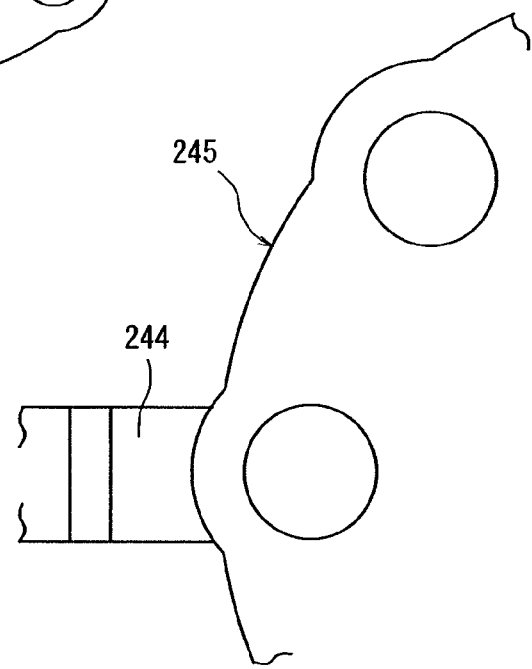
FIG. 28 is a plan view illustrating a retreating motion of the slide block in relation to the cooling/drying unit shown in FIG. 21.

Referring to FIGS. 27 and 28, at the time of handing the preformed article 34 over to the cooling/drying unit 204, the guide block 244 provided under the slide block 214 is limited by being contacted to an extension-limiting block 245 that is provided on the cooling/drying unit 204 and that rotates together with the grip unit 209, so that the slide block 214 retreats and is positioned.

The slide block 214 may be moved forward and back by being controlled by drive means such as a servo motor or the like instead of using the guide block 244 and the extension-limiting block 245, to determine the position of the grip unit 209.

Handing over the preformed articles 34 between the downstream hand-over unit 203 and the cooling/drying unit 204 is the same as handing over the preformed articles 34 between the upstream hand-over unit 202 and the cooling/drying unit 204.

Over the slide block 214, a slide plate 221 is mounted to move forward and back in the radial direction of the rotary arm 208 on the guide plate 219 that is provided on the upper surface of the slide block 214. Between an end surface of the guide plate 219 on the proximal end side thereof and a protuberance 222 formed on the upper surface of the slide block 214, a rod 223 is provided penetrating through the protuberance 222 and with its axis extending in the radial direction of swing turn of the grip 218. The rod 223 is surrounded by a spring 224 which is so disposed as to urge the slide plate 221 toward the end side.

Referring to the right side in FIG. 22, a grip support member 226 and a grip 218 are attached to an end of the slide plate 221. The grip 218 is so constituted as to be opened when the grip support member 226 moves back and to be closed when the grip support member 226 moves forward. When the grip 218 is closed, the ring-like flange 40 of the preformed article 34 is supported on the grip groove 220 nearly in concentric therewith.

Referring to FIG. 22, a cam follower 228 of a circular shape in cross section is attached to the lower part of the swing arm 212. Referring to FIG. 21, a cam groove 229 is fixed to the hand-over unit 202, and the grip unit 209 turns and moves along the shape of the cam groove 229 as the cam follower 228 is fitted to the cam groove 229. On the side of the compression-forming machine 201 and the cooling/drying unit 204, the cam groove 229 is formed describing a deformed arcuate orbit so as to meet a circular orbit of the metal molds 206 of the compression-forming machine 201 and to meet a circular orbit of the cooling/drying unit 204.

Figure 23:
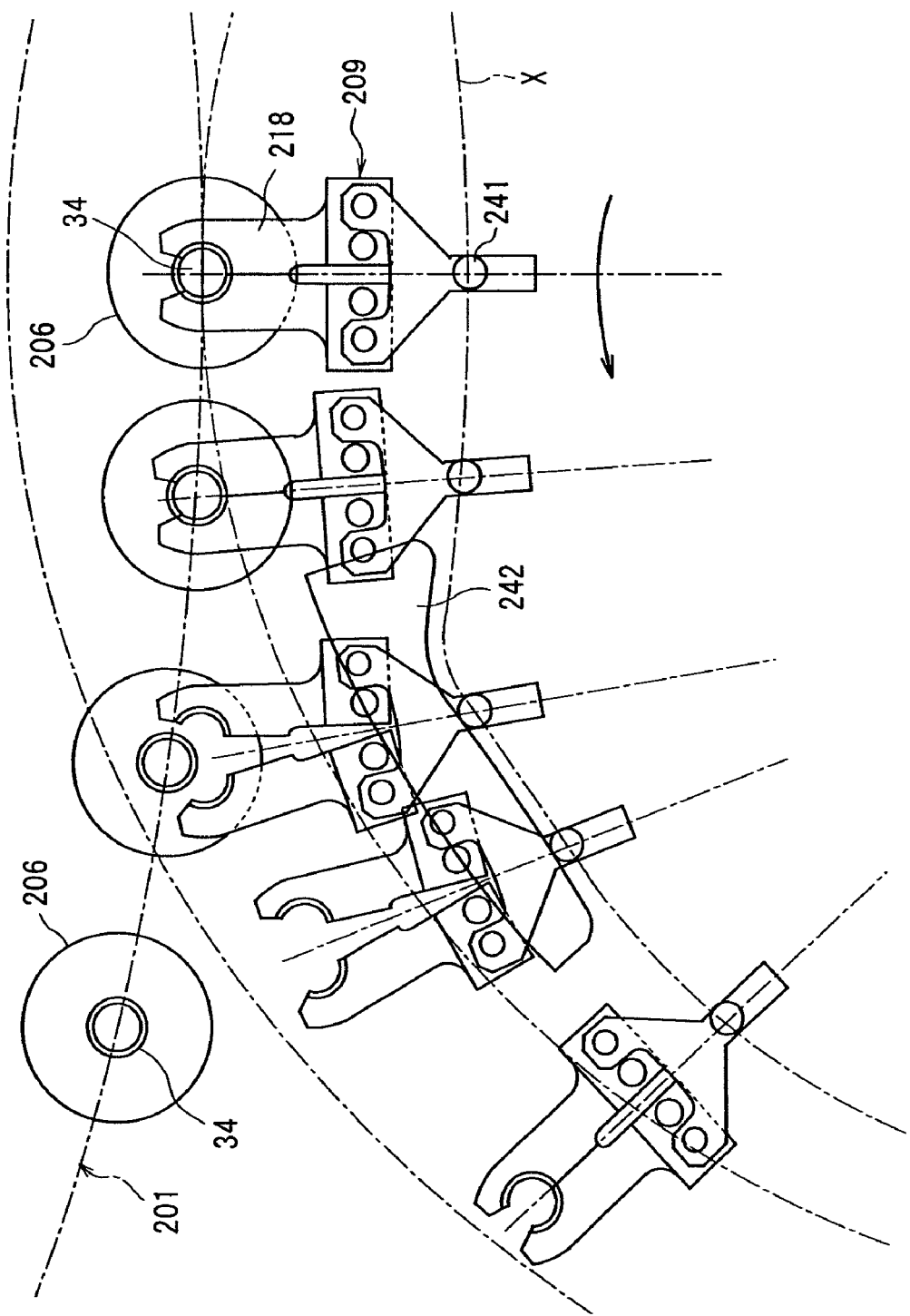
FIG. 23 is a plan view of a portion for handing the preformed articles from a compression-forming machine over to the preformed article hand-over unit on the upstream side shown in FIG. 21.

A grip opening/closing cam follower 241 is attached to an upper part of the slide plate 221 in the grip unit 209. Referring to FIG. 23, the hand-over unit 202 is provided with a deformed arcuate cam 242. As the grip opening/closing cam follower 241 comes into contact with the deformed arcuate cam 242, the slide plate 221 moves backward, whereby the grip 218 opens, and the ring-like flange is placed on the grip groove 220 so as to hold the blow-formed portion of the preformed article 34. The grip 218 closes as the grip opening/closing cam follower 241 passes over the deformed arcuate cam 242.

In the cooling/drying unit shown in FIG. 21, a plurality of rotary arms 231 supporting the grip units 209a on the side of the cooling/drying unit are arranged maintaining an equal distance, and the grip units 209a attached to the support members 232 arranged at the ends of the rotary arms 231 rotate so as to move on a circular orbit with the axis of rotation as a center.

Referring to FIG. 22, the support member 232 is provided with a slide plate 221a which moves the guide plate 219a provided on the lower surface of the support member 232 forward and backward in the radial direction of the rotary arms 231. Between an end surface of the guide plate 219a on the proximal end side thereof and a protuberance 222a formed on the lower surface of the support member 232, a rod 223a is provided penetrating through the protuberance 222a and with its axis extending in the radial direction of swing turn of the grip 218a. The rod 223a is surrounded by a spring 224a which is so disposed as to urge the slide plate 221a toward the end side.

Figure 24:
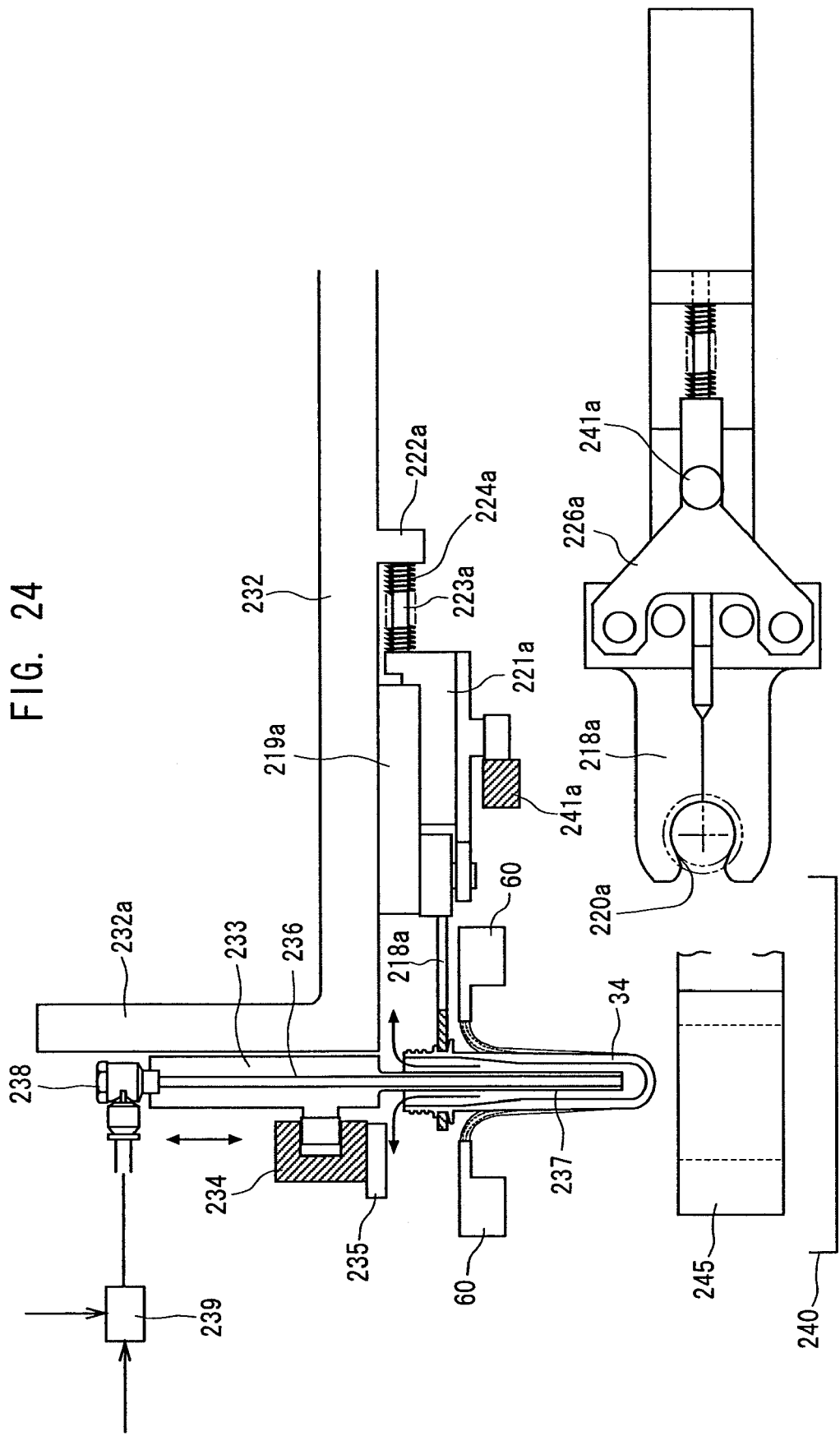
FIG. 24 is a side view of a portion where the cooling liquid blow nozzles are arranged on the upstream of the cooling/drying unit of FIG. 21.

Referring to FIG. 24, a grip support member 226a and a grip 218a are attached to an end of the slide plate 221a. The grip 218a is so constituted as to be opened when the grip support member 226a moves back and to be closed when the grip support member 226a moves forward. When a pair of grips 218a are closed, the mouth-and-neck portion 36 of the preformed article 34 is held. An upright portion 232a extending upward in the vertical direction is provided at an end of the support member 232, and a lift slide 233 is disposed on the outer surface of the upright portion 232a. A lift cam 234 is attached to the outer surface side of the lift slide 233, is disposed along a direction in which the grip unit 209a rotates, and moves up and down being guided by a cam plate 235 having a curved line in the up-and-down direction. A passage 236 for the cooling air or for the cooling liquid and for the drying air, is formed inside the lift slide 233, and a nozzle 237 is attached to the lower part of the lift slide 233. Referring to FIG. 24, a connection port 238 is provided at an upper end of the lift slide 233, and is connected to a compressed air supply portion and to a cooling liquid supply portion through an air/cooling liquid change-over valve 239.

The change-over valve 39 may be omitted when the interior of the preformed article 34 is to be cooled by the air only.

Figure 25:
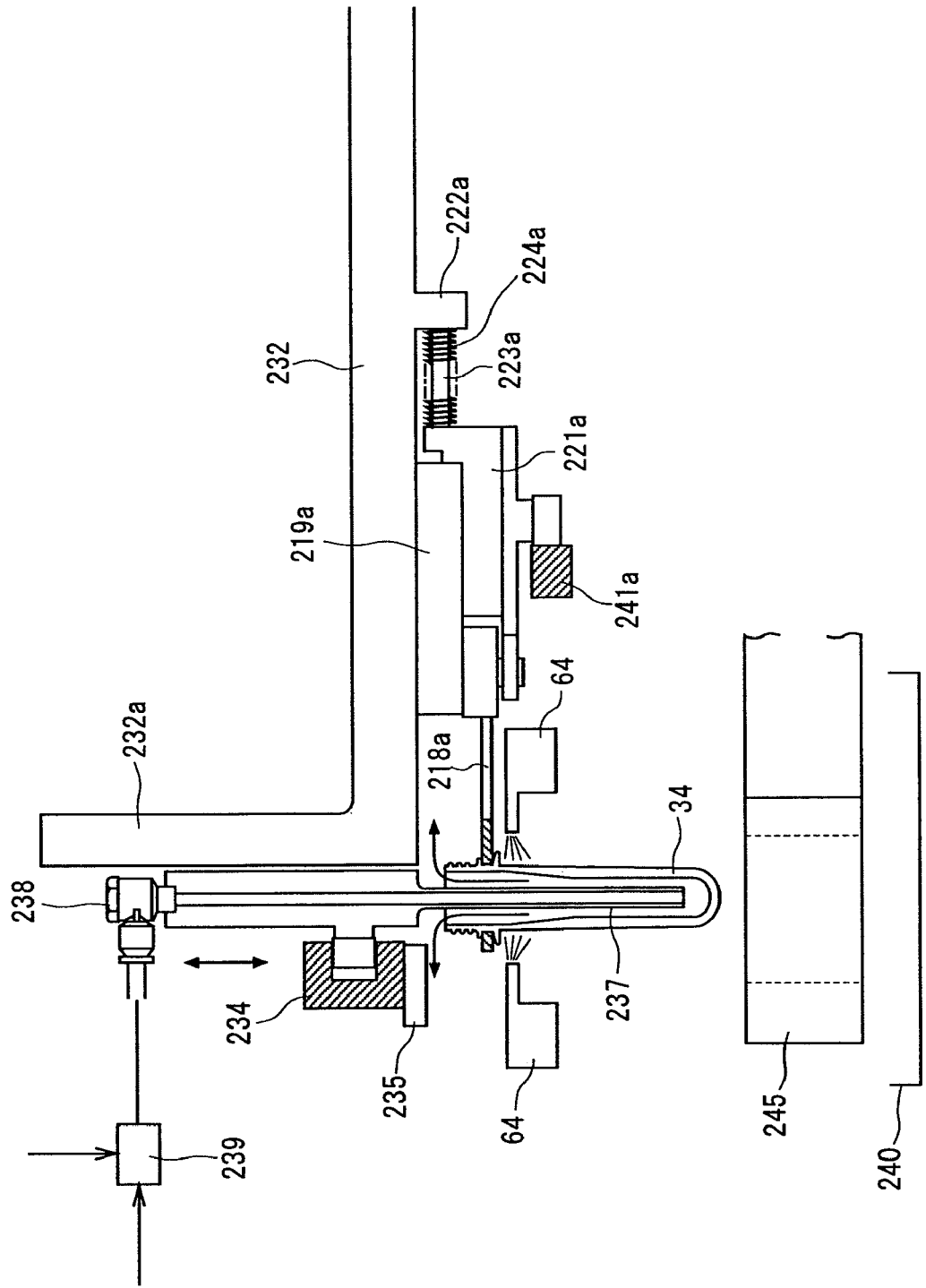
FIG. 25 is a side view of a portion where the gas stream blow nozzles are arranged on the downstream of the cooling/drying unit of FIG. 21.

In FIG. 21, cooling liquid blow nozzles 60 (same as those shown in FIG. 5 or those shown in FIG. 9 but that are curved) are arranged as shown in FIG. 24 along the conveyer passage upstream of the cooling/drying unit 204 with the ends of nozzles thereof being directed to the blow-formed portions of the preformed articles 34. The cooling liquid blow nozzles 60 may be the spray blow nozzles 56 shown in FIG. 4. In FIG. 21, further, gas stream blow nozzles 64 (same as those shown in FIG. 6) are arranged as shown in FIG. 25 along the conveyer passage downstream of the cooling/drying unit with the ends of nozzles thereof being directed to the blow-formed portions of the preformed articles 34. A circular cooling liquid recovery tray 240 is arranged under the orbit of the grip units 209a of the cooling/drying unit 204. It is desired that the cooling liquid recovered by the recovery tray 240 is repetitively used being circulated again to the cooling liquid blow nozzles 60 through the circulating pump 143, purifying unit 144, sterilizing vessel 145 and temperature-maintaining unit 146 in the water conduit system shown in FIG. 15.

Based on the above-mentioned constitution as shown in FIG. 21, the preformed article formed by the compression-forming machine 201 approaches the circular orbit of the grips 218 of the preformed article hand-over unit 202 on the upstream side. When the preformed article 34 arrives at a region of a section L shown in FIG. 21, the grip 218 also arrives at the region of the section L and is controlled for its orbit so as to follow the circular orbit of the metal mold 206. The orbit is controlled by moving the slide block 214 forward and back while permitting the grip unit 209 to swing. In the region of the section L, the transfer (circumferential) speeds are brought into agreement between the grip 218 and the metal mold 206. Referring next to FIG. 23, the grip 218 is opened by the deformed arcuate cam 242, and is caused to advance toward the blow-formed portion of the preformed article 34 so as to hold the preformed article 34. Thereafter, the grip 218 is closed after having passed over the deformed arcuate cam 242, and the ring-like flange of the preformed article 34 is supported by the grip 218.

Upon turning about one-half, the grip unit 209 comes in contact with the orbit of the cooling/drying unit 204. At the position of handing over the preformed articles 34 to the hand-over unit 203 from the cooling/drying unit 204, as shown in FIG. 22, the grip 218a holds the lower side of the mouth-and-neck portion 36 (upper side of the ring-like flange 40). The grip 218a is opened and closed by the same mechanism as the one for the grip 218 shown in FIG. 23.

At a moment when the preformed article 34 is handed over to the cooling/drying unit 204 from the hand-over unit 202, as shown in FIG. 22, the lift slide 233 is at an upper position, and the nozzle 237 is just over the preformed article 34. Next, as shown in FIG. 24, the lift slide 233 descends being guided by the cam plate 235, and the nozzle 237 is inserted in the preformed article 34. When the grip unit 209a turns to a place where the cooling liquid blow nozzle 60 is disposed, the cooling liquid blow nozzle 60 injects the cooling water onto the blow-formed portion 38 of the preformed article 34. The preformed article 34 is thus cooled. At the same time, the compressed air is fed to the nozzle 237 through the changeover valve 239, and the interior of the preformed article is cooled by the air. The interior of the preformed article may be cooled by the cooling water instead of using the air.

After cooled by the cooling liquid, the preformed article 34 is conveyed to the downstream side of the conveyer line of the cooling/drying unit 204. The gas stream blow nozzles 64 are arranged along the downstream conveyer line as shown in FIG. 25 to blow away the droplets of cooling water adhered on the outer peripheral surfaces of the preformed articles 34. When the interior of the preformed article 34 is cooled by the cooling water or when the cooling water has entered into the interior, the residual cooling water is blown away by the injection nozzle 237 to dry the preformed article 34.

On the most downstream side of the cooling/drying unit 204, the nozzle 237 is taken out from the interior of the preformed article 34 due to the action of the lift cam 234 and the cam plate 235, and the preformed article 34 is handed over to the hand-over unit 203 on the downstream side. Thereafter, the preformed article 34 is transferred from the hand-over unit 203 to the conveyer 205, and is conveyed to the working step on the downstream side. The structure of the hand-over unit 203 on the downstream side is the same as the structure of the hand-over unit 202 on the upstream side.

Use of the rotary type cooling/drying unit makes it possible to further decrease the space for working.

The compression-forming machine 201 successively forms preformed articles 34 maintaining an equal distance, and the hand-over unit 202 successively hands the preformed articles 34 over to the cooling/drying unit 204, so that the preformed articles 34 are cooled by the cooling water under the same cooling condition. As a result, the preformed articles 34 are uniformly cooled.

When the preformed articles 34 are formed by the compression-forming machine 201, the compression-forming machine 201 conveys the preformed articles 34 to the cooling means on the downstream side maintaining an equal distance and successively in the above-mentioned first to fourth embodiments, too, that use no rotary conveyer means. Therefore, the preformed articles 34 are cooled by the cooling water under the same condition and are, therefore, uniformly cooled.

Though the invention was described above by way of embodiments, it should be noted that the invention can be further modified or changed in a variety of other ways, as a matter of course, without departing from the technical spirit of the invention.

Further, the preformed article is not limited to the one of the shape of an inverse circular truncated cone but may be the one of the shape of a preformed article usually used for the blow-forming, such as the one of an ordinary cylindrical shape with bottom of a semispherical shape.

The mouth-and-neck portion 36 may have a screw formed on the outer peripheral surface thereof when a sealing member for sealing the opening is a cap.

Like the cooling liquid blow nozzles 60 and the gas stream blow nozzles 64, the spray blow nozzles 56 work to evenly blow the spray if the spray is brown from both sides. Like the spray blow nozzles 56, further, the cooling liquid blow nozzles 60 and the gas stream blow nozzles 64 may effect the blow from one side only. By effecting the blow from both sides as in this embodiment, however, the cooling and drying by blow are evenly effected from both sides, which is desirable.

The guide shafts 170 and 171 of the aligning conveyer line 164 may have smooth conical surfaces without forming screws on the outer surfaces thereof.

Further, the guide shafts 170 and 171 may comprise two ordinary cylinders arranged in parallel with the axes of rotation being tilted and the lower side thereof working as an aligning outlet. Or, the two ordinary cylinders may be horizontally arranged out of parallel so that the broader side works as an aligning outlet.

The invention claimed is:

1. An apparatus for cooling preformed articles, wherein the preformed article as formed by a forming machine but before being subjected to a blow-forming includes a mouth-and-neck portion and a blow-formed portion, the mouth-and-neck portion being of a cylindrical shape and having a ring-like flange formed at the lower end thereof, and the blow-formed portion being of the shape of a cylinder with bottom continuous to the lower end of the mouth-and-neck portion, the apparatus for cooling preformed articles, comprising:

conveyer means for conveying the preformed articles through a conveyer passage inclusive of a spray zone and a cooling zone arranged downstream of said spray zone;

holding means for holding the preformed articles in at least said spray zone and said cooling zone;

spray blow means for blowing a spray of water onto said preformed articles in said spray zone; and cooling liquid blow means for cooling said preformed articles by the cooling water in said cooling zone.

2. The apparatus for cooling preformed articles according to claim 1, wherein said spray blow means comprises spray blow nozzles arranged along said conveyer passage, and a said spray of water having particles of 1 to 5 µm in diameter is blown onto said preformed articles from said spray blow nozzles.

3. The apparatus for cooling preformed articles according to claim 2, wherein said cooling liquid blow means comprises cooling liquid blow nozzles arranged along said conveyer passage, and said spray blow nozzles and said cooling liquid blow nozzles are tilted to blow said spray of water and said cooling water respectively onto said preformed articles.

4. The apparatus for cooling preformed articles according to claim 1, wherein said conveyer means comprises conveyers of endless chains including at least either a straight conveyer passage or a curved conveyer passage.

5. The apparatus for cooling preformed articles according to claim 1, wherein said conveyer means is a rotary conveyer passage which rotates with the axis of rotation as a center.

6. The apparatus for cooling preformed articles according to claim 1, wherein said holding means comprises upper surfaces of conveyer running portions of conveyers constituted by endless chains arranged in parallel on the right and left maintaining a distance, and ring-like flanges of the preformed articles are suspended between said conveyer running portions.

7. The apparatus for cooling preformed articles according to claim 1, wherein said holding means comprises gap portions formed maintaining a gap up and down in the conveyer running portions of conveyers constituted by endless chains arranged in parallel on the right and left maintaining a distance, and ring-like flanges of the preformed articles are held in the gap portions.

8. The apparatus for cooling preformed articles according to claim 6, wherein the conveyers comprising the endless chains provided in parallel on the right and left maintaining a distance, travel at speeds different relative to each other at the time of conveying the preformed articles.

9. The apparatus for cooling preformed articles according to claim 5, wherein said holding means comprises grippers arranged on the rotary conveyer passage for holding the preformed articles maintaining a distance to the surroundings of the blow-formed portions of the preformed articles, and the ring-like flanges of the preformed articles are placed on the upper surfaces of said grippers.

10. The apparatus for cooling preformed articles according to claim 1, wherein said cooling liquid blow means includes a circulating pump for supplying the cooling water, water-purifying means for removing fouling matter from the cooling water, sterilizing means for sterilizing the cooling water, and temperature-maintaining means for adjusting the temperature of the cooling water.

11. The apparatus for cooling preformed articles according to claim 1, wherein gas ejection means is provided on the downstream of said cooling apparatus for removing the cooling water adhering on or staying in said preformed articles.

12. The apparatus for cooling preformed articles according to claim 11, wherein said gas ejection means injects a gas onto the outer surfaces of the preformed articles from the transverse direction, and the position where said gas ejection means blows the gas onto the outer surfaces of said preformed articles becomes low from the upstream side toward the downstream side in the direction in which said preformed articles are conveyed.

13. The apparatus for cooling preformed articles according to claim 11, wherein said gas ejection means injects a gas into the inner surface side of the preformed articles though the openings thereof, and the positions where said gas ejection means blows the gas into the inner surfaces of said preformed articles are deviated from the centers of the openings of said preformed articles.

* * * * *